(12) United States Patent
Roehm et al.

(10) Patent No.: US 12,319,419 B2
(45) Date of Patent: Jun. 3, 2025

(54) FLUID-FILLED THRUST LINK APPARATUS AND ASSOCIATED METHOD

(71) Applicant: General Electric Company, Evendale, OH (US)

(72) Inventors: Ryan T. Roehm, Evendale, OH (US); Brandon W. Miller, Evendale, OH (US); Robert Eugene Dyson, West Chester, OH (US); Arthur W. Sibbach, Boxford, MA (US); Donald S. Yeager, West Chester, OH (US); John C. Schilling, Evendale, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/947,832

(22) Filed: Nov. 14, 2024

(65) Prior Publication Data
US 2025/0100700 A1 Mar. 27, 2025

Related U.S. Application Data

(63) Continuation of application No. PCT/US2024/048431, filed on Sep. 25, 2024.

(60) Provisional application No. 63/585,166, filed on Sep. 25, 2023.

(51) Int. Cl.
*B64D 27/40* (2024.01)
(52) U.S. Cl.
CPC .......... *B64D 27/40* (2024.01); *B64D 27/406* (2024.01)

(58) Field of Classification Search
CPC .............................. B64D 27/40; B64D 27/406
See application file for complete search history.

(56) References Cited

U.S. PATENT DOCUMENTS

| | | |
|---|---|---|
| 5,065,959 A | 11/1991 | Bhatia et al. |
| 5,332,070 A | 7/1994 | Davis et al. |
| 5,687,948 A | 11/1997 | Whiteford et al. |
| 5,775,638 A | 7/1998 | Duesler |
| 5,931,441 A | 8/1999 | Sakamoto |
| 6,296,203 B1 | 10/2001 | Manteiga et al. |
| 6,330,985 B1 | 12/2001 | Manteiga et al. |
| 7,063,290 B2 | 6/2006 | Marche |

(Continued)

FOREIGN PATENT DOCUMENTS

| | | |
|---|---|---|
| FR | 2883939 A1 | 10/2006 |
| JP | 2007139008 A | 6/2007 |

(Continued)

*Primary Examiner* — Richard G Davis
(74) *Attorney, Agent, or Firm* — HANLEY, FLIGHT & ZIMMERMAN, LLC

(57) ABSTRACT

Fluid-filled thrust link apparatus and associated method are disclosed. A thrust link for an aircraft engine includes a first wall having a forward portion and an aft portion at opposite ends of the thrust link, the forward portion coupled to the aircraft engine, the aft portion coupled to the aircraft engine, a pylon, or an aircraft associated with the aircraft engine, and a second wall within an interior area surrounded by the first wall, the second wall spaced apart from the first wall, a space between the first wall and the second wall defining a channel within the interior area, the channel including a fluid, the fluid pressurized based on a damping ratio to withstand a resonant vibration frequency generated by the aircraft engine.

20 Claims, 19 Drawing Sheets

(56) References Cited

U.S. PATENT DOCUMENTS

| | | |
|---|---|---|
| 7,093,996 B2 | 8/2006 | Wallace et al. |
| 7,296,768 B2 | 11/2007 | Machado et al. |
| 8,076,889 B2 | 12/2011 | Lai et al. |
| 8,156,648 B2 | 4/2012 | Audart-Noel et al. |
| 8,322,651 B2 | 12/2012 | Levert et al. |
| 8,322,652 B1 | 12/2012 | Stretton |
| 8,439,299 B2 | 5/2013 | Luo et al. |
| 8,613,404 B2 | 12/2013 | Lafont et al. |
| 9,097,307 B2 | 8/2015 | Boulet et al. |
| 9,297,438 B2 | 3/2016 | Meacham et al. |
| 9,664,112 B2 | 5/2017 | Balk et al. |
| 10,066,505 B2 | 9/2018 | Ertas et al. |
| 10,731,510 B2 | 8/2020 | Hanrahan |
| 11,420,755 B2 | 8/2022 | Sharma et al. |
| 11,485,507 B2 | 11/2022 | Madjlesi |
| 11,697,506 B2 | 7/2023 | Schelfaut et al. |
| 12,158,185 B2 | 12/2024 | Metge et al. |
| 2005/0254938 A1 | 11/2005 | Sheath et al. |
| 2012/0051909 A1 | 3/2012 | Mcguire |
| 2015/0360788 A1 | 12/2015 | Hellegouarch |
| 2019/0329895 A1* | 10/2019 | Madjlesi ............... F16F 7/108 |
| 2022/0055757 A1* | 2/2022 | Shinde ................. B64D 27/40 |
| 2022/0268335 A1 | 8/2022 | Yasui |

FOREIGN PATENT DOCUMENTS

| | | |
|---|---|---|
| WO | 96/20111 | 7/1996 |
| WO | 2014111654 | 7/2014 |

\* cited by examiner

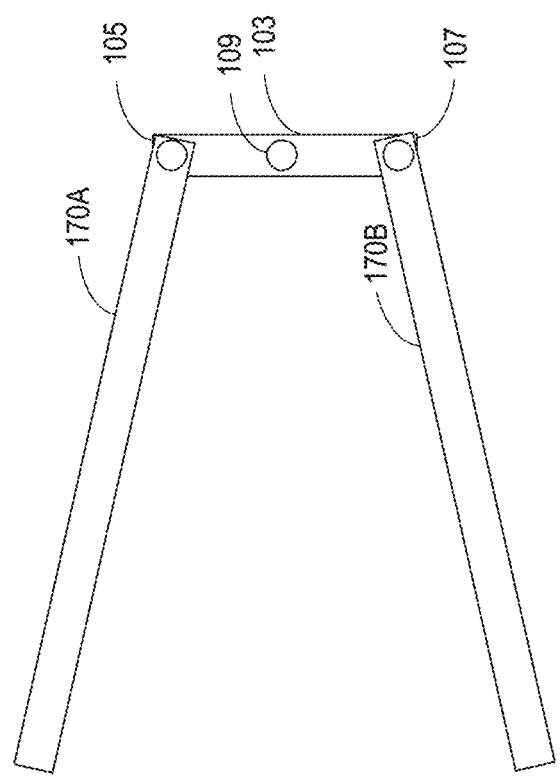

FLUID-FILLED THRUST LINK APPARATUS AND ASSOCIATED METHOD

RELATED APPLICATIONS

This patent arises from a continuation of International Patent Application No. PCT/US2024/048431, which was filed on Sep. 25, 2024, and which claims priority to U.S. Provisional Patent Application No. 63/585,166, which was filed on Sep. 25, 2023. International Patent Application No. PCT/US2024/048431 and U.S. Provisional Patent Application No. 63/585,166 are hereby incorporated herein by reference in their entireties. Priority to International Patent Application No. PCT/US2024/048431 and U.S. Provisional Patent Application No. 63/585,166 is hereby claimed.

FIELD OF THE DISCLOSURE

This disclosure relates generally to gas turbine engines and, more particularly, to fluid-filled thrust link apparatus and associated method.

BACKGROUND

During operation, aircraft engines, automobile engines, generators, etc., also referred to herein as vibration-producing devices, produce vibrations. Vibration-producing devices can include additional hardware structures to withstand resonant frequencies caused by the vibrations, as such frequencies can cause damage to the vibration-producing device.

BRIEF DESCRIPTION OF THE DRAWINGS

FIG. 1C is a cross-sectional view of an evener bar of the gas turbine engine of FIG. 1A and/or FIG. 1B.

DETAILED DESCRIPTION

Figure 1A:
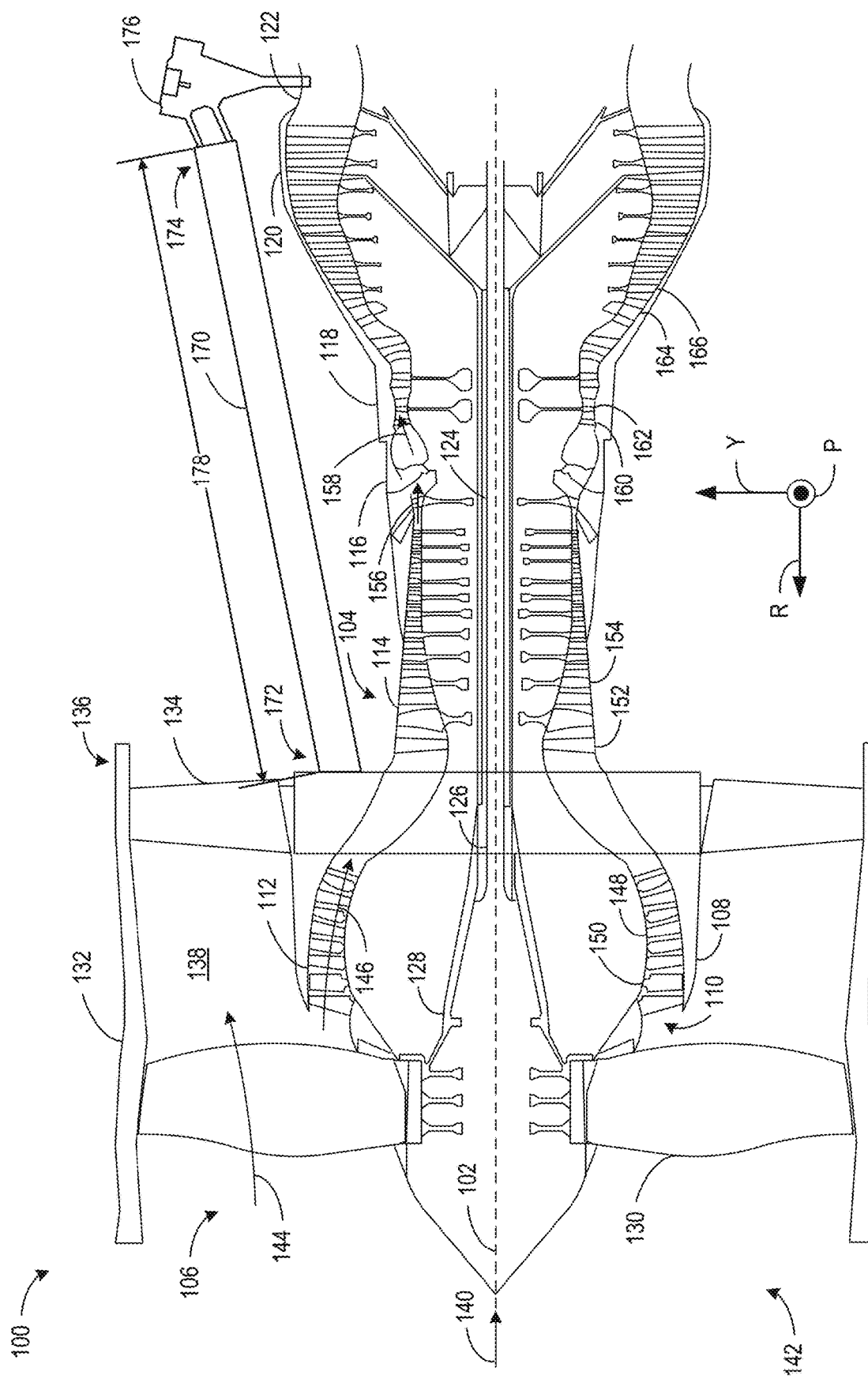
FIG. 1A is a cross-sectional view of a gas turbine engine.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−5% unless otherwise specified herein.

Vibration-producing devices, specifically aircraft engines, produce vibrations during operation. The vibrations can cause damage to the aircraft, the pylons connecting the engine to the aircraft, the engine itself, or any other component in the aircraft. Thrust links are positioned within the engine structure of the aircraft to dissipate these vibrations.

In platforms such as automobile engines, generators, etc., other structures and/or mechanisms are used to counteract generated vibrations. While the examples disclosed herein are targeted towards the platform of aircraft turbine engines, the examples disclosed herein can be used in alternate platforms to damp/dissipate vibrations produced by other vibration-producing devices.

As engine footprints get smaller, thrust links also reduce in overall size to be able to fit within the engine footprint. As such, existing geometry and damping methods do not provide sufficient responses to the vibrations.

Typical aircraft turbine engines include a low-pressure turbine (LPT) and a high-pressure turbine (HPT), each operating at different rotational speeds for ideal performance. Each turbine produces a different vibration due to these operating speeds, and thus, both turbines produce a different frequency based on the vibrations produced. These frequencies result in different responses to counteract/dissipate the vibrations produced.

In some examples, existing vibration damping devices are internally positioned within an aircraft engine (e.g., a vibration-producing device) or externally couple the aircraft engine to an external structure to transfer the vibrations to or share the vibrations with the external structure. Existing vibration damping devices associated with aircraft engines are unable to provide a damping response to cover both the LPT operating range and the HPT operating range. As a result, the aircraft engine can encounter potentially damaging vibrations at some point within the operating ranges of the turbines.

Examples disclosed herein provide vibration damping devices that withstand resonant vibration frequencies produced by aircraft engines throughout the operating ranges of the turbines. Examples herein provide vibration damping devices (e.g., vibration dampers) that withstand vibrations produced by a LPT and a HPT within an aircraft engine, covering the entire operating range of the aircraft engine. Examples herein provide structural changes to thrust links to create resonant vibration frequency responses to cover the operating range of an aircraft engine irrespective of the total length/footprint of the thrust link.

FIG. 1A is a cross-sectional view of a turbofan-type gas turbine engine ("aircraft engine 100"), which can be used on an aircraft. As shown in FIG. 1A, the aircraft engine 100 defines a longitudinal or axial centerline axis 102 extending therethrough for reference. In general, the aircraft engine 100 includes a core section 104 disposed downstream from a fan section 106.

The core section 104 generally includes a substantially tubular outer casing 108 that defines an annular inlet 110. The outer casing 108 can be formed from a single casing or multiple casings. The outer casing 108 encloses, in serial flow relationship, a compressor section having a booster or low pressure compressor ("LP compressor 112") and a high pressure compressor ("HP compressor 114"), a combustion section 116 (e.g., a combustor), a turbine section having a high pressure turbine ("HP turbine 118") and a low pressure turbine ("LP turbine 120"), and an exhaust section 122. A high pressure shaft or spool ("HP shaft 124") drivingly couples the HP turbine 118 and the HP compressor 114. A low pressure shaft or spool ("LP shaft 126") drivingly couples the LP turbine 120 and the LP compressor 112. The LP shaft 126 may also couple to a fan spool or shaft 128 of the fan section 106. In some examples, the LP shaft 126 may couple directly to the fan shaft 128 (e.g., a direct-drive configuration). In some examples, the HP turbine 118 implements means for generating a first resonant vibration frequency. In some examples, the LP turbine 120 also implements means for generating a second resonant vibration frequency different than the first resonant vibration frequency.

As shown in FIG. 1A, the fan section 106 includes a plurality of fan blades 130 coupled to and extending radially outwardly from the fan shaft 128. An annular fan casing 132, (e.g., a nacelle, etc.) circumferentially encloses the fan section 106 and/or at least a portion of the core section 104. The annular fan casing 132 is supported relative to the core section 104 by a plurality of circumferentially-spaced apart outlet guide vanes 134. Furthermore, a downstream section 136 of the annular fan casing 132 can enclose an outer portion of the core section 104 to define a bypass airflow passage 138 therebetween. In some examples, the fan section 106 implements means for generating a third resonant vibration frequency.

As illustrated in FIG. 1A, air 140 enters an inlet portion 142 of the aircraft engine 100 during operation thereof. A first portion 144 of the air 140 flows into the bypass airflow passage 138, while a second portion 146 of the air 140 flows into the inlet 110 of the LP compressor 112. One or more sequential stages of LP compressor stator vanes 148 and LP compressor rotor blades 150 coupled to the LP shaft 126 progressively compress the second portion 146 of the air 140 flowing through the LP compressor 112 en route to the HP compressor 114. Next, one or more sequential stages of HP compressor stator vanes 152 and HP compressor rotor blades 154 coupled to the HP shaft 124 further compress the second portion 146 of the air 140 flowing through the HP compressor 114. This provides compressed air 156 to the combustion section 116 where it mixes with fuel and burns to provide combustion gases 158.

The combustion gases 158 flow through the HP turbine 118 in which one or more sequential stages of HP turbine stator vanes 160 and HP turbine rotor blades 162 coupled to the HP shaft 124 extract a first portion of kinetic and/or thermal energy from the combustion gases 158 This energy extraction supports operation of the HP compressor 114. The combustion gases 158 then flow through the LP turbine 120 where one or more sequential stages of LP turbine stator vanes 164 and LP turbine rotor blades 166 coupled to the LP shaft 126 extract a second portion of thermal and/or kinetic energy therefrom. This energy extraction causes the LP shaft 126 to rotate, thereby supporting operation of the LP compressor 112 and/or rotation of the fan shaft 128. The combustion gases 158 then exit the core section 104 through the exhaust section 122 thereof.

Different portions and/or operation of the aircraft engine 100 produce various vibration frequencies. These vibrations can cause structural damage to internal components of the aircraft engine 100, to one or more external components (e.g., a pylon) that couple the aircraft engine 100 to an aircraft, and/or components of the aircraft.

In the example of FIG. 1A, a thrust link 170 is coupled to the aircraft engine 100. In some examples, the thrust link 170 is configured to transfer thrust generated by the aircraft engine 100 to surrounding engine hardware (e.g., transferring the thrust force generated by the aircraft engine 100 to the aircraft itself through a fan casing, a pylon, etc.). In some examples, the thrust link 170 provides a damping response to the vibrations generated, thereby reducing or eliminating the vibrations. In the examples disclosed herein, the aircraft engine 100 includes two thrust links 170, however more or fewer can be used interchangeably herein for other platforms.

In the example of FIG. 1A, the thrust link 170 is coupled to the aircraft engine 100 at a forward end 172 (e.g., a radially inward end, an end of the thrust link 170 closer to the axial centerline axis 102) and an aft end 174 (e.g., a radially outward end, an end of the thrust link 170 further from the axial centerline axis 102). In the example of FIG. 1A, the forward end 172 couples to the outlet guide vanes 134, however, the forward end 172 is not limited to just coupling to the outlet guide vanes 134. In some examples, the forward end 172 couples to the annular fan casing 132 or another structure capable of withstanding (e.g., supporting) such a structural connection, such as a frame member (e.g., a fan hub frame, an intermediate compressor case). The structure to which the forward end 172 couples (e.g., the annular fan casing 132, the frame member) can couple to a pylon connecting the aircraft engine 100 to the aircraft.

In the example of FIG. 1A, the aft end 174 is coupled to the tubular outer casing 108 at the top portion of the aircraft engine 100 (e.g., in the radial direction, along the positive Y-axis) via an aft thrust link connector 176. In examples disclosed herein, the aft thrust link connector 176 is purely a connection point to couple the aft end 174 of the thrust link 170 to another structure, such as the aircraft engine 100. In some examples, the aft end 174 is coupled to surrounding engine hardware (e.g., the annular fan casing 132/nacelle) or the pylon that couples the aircraft engine 100 to an aircraft, as discussed in association with FIG. 1B.

Figure 1B:
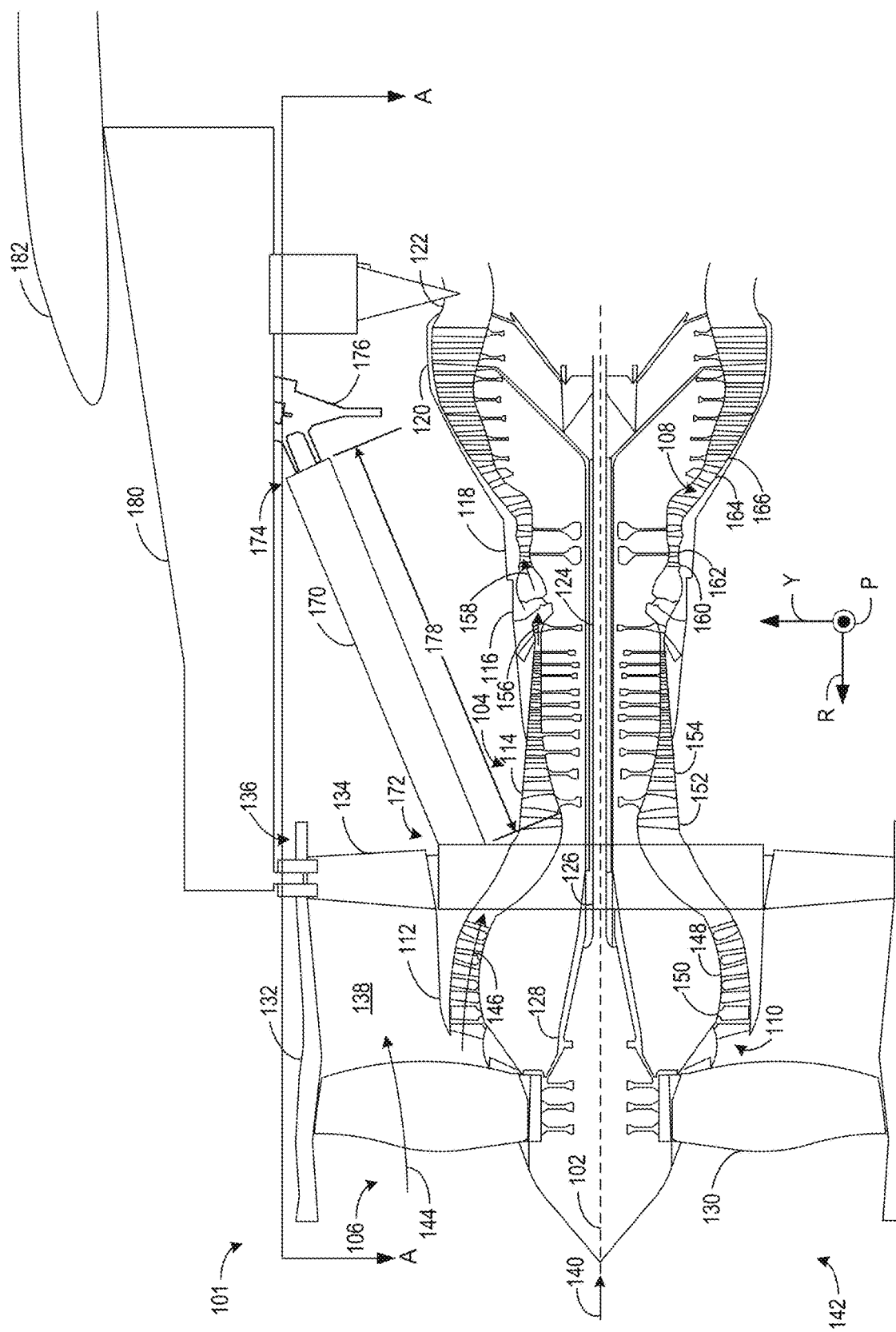
FIG. 1B is a cross-sectional view of another gas turbine engine.

FIG. 1B illustrates another example turbofan engine 101 that can be used on an aircraft. The turbofan engine 101 includes the aft end 174 of the thrust link 170 coupled to a pylon 180 extending from a wing 182 of the aircraft. Specifically, the aft thrust link connector 176 couples the aft end 174 of the thrust link 170 to the pylon 180. Additionally or alternatively, the structure to which the aft thrust link connector 176 couples (e.g., the pylon 180 of FIG. 1B) can correspond to the aircraft itself (e.g., a fuselage).

In the examples of FIGS. 1A and 1B, the thrust link 170 includes a span 178 (e.g., a length). The span 178 is used to define a frequency response to the vibration generated by the aircraft engine 100. Further detail regarding the span 178 is discussed herein.

The turbofan engines 100, 101 of FIGS. 1A and 1B can include more than one (e.g., two) of the thrust link 170 to ensure that vibration protection is distributed across different areas of the turbofan engines 100, 101. FIG. 1C illustrates an isolated view of an evener bar 103 of the turbofan engines 100, 101 of FIGS. 1A and 1B from a viewpoint of a cross-section A-A of FIGS. 1A and 1B. The evener bar 103 includes a first end 105 coupled to a first thrust link 170A and a second end 107 coupled to a second thrust link 170B. For example, the evener bar 103 can be coupled to the aft end 174 of the first thrust link 170A and the second thrust link 170B. A mid-portion 109 of the evener bar 103 is coupled to the aircraft engine 100 (FIG. 1A) or the pylon 180 (FIG. 1B). The evener bar 103 combines a first load encountered by the first thrust link 170A and a second load encountered by the second thrust link 170B and enables the first and second loads to be shared (e.g., evenly distributed) between the first thrust link 170A and the second thrust link 170B. The mid-portion 109 of the evener bar 103 provides an additional support point to ensure that loads encountered by the first thrust link 170A and/or the second thrust link 170B are not statically indeterminate.

Figure 2:
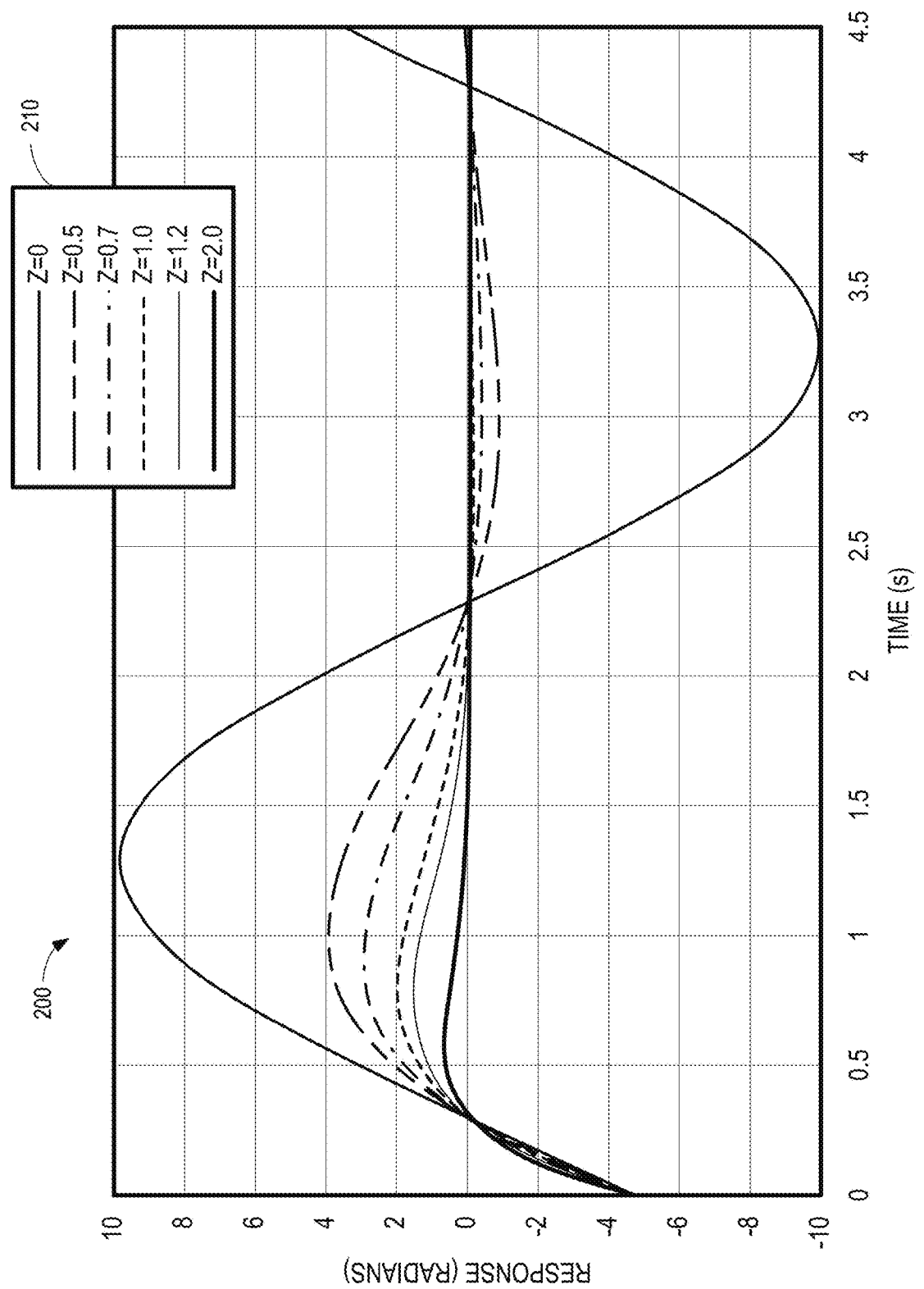
FIG. 2 is a damping graph depicting a series of damping ratios used to counteract/dissipate the resonant vibration frequency produced by the gas turbine engines of FIGS. 1A and 1B.

FIG. 2 is a damping graph 200 depicting a series of damping ratios used to counteract/dissipate the resonant vibration frequency produced by the turbofan engines 100, 101 of FIGS. 1A and 1B. In the example of FIG. 2, the x-axis represents a time of the response in seconds and the y-axis represents an amplitude of the response in radians. Each line in the damping graph 200 depicts a separate damping ratio and a corresponding amplitude response (e.g., see the legend 210 of FIG. 2). The damping ratio relates the decay of the response due to a stimulus to the natural frequency of hardware. The damping ratio, represented by zeta ($\zeta$), is undamped at a value of 0, critically damped at a value of 1, and overdamped at any value greater than 1.

Equation 1 is used to determine an appropriate damping ratio based on the resonant vibration frequency of the aircraft engine 100:

$$y(t)=Ae^{-\lambda*t}*\cos(\omega*t-\alpha). \qquad \text{Equation 1}$$

In Equation 1 above, y(t) is the instantaneous amplitude of the response to the resonant vibration frequency produced by the aircraft engine 100. In the examples disclosed herein, the instantaneous amplitude of the response includes a maximum amplitude that the aircraft engine 100 can withstand, thereby driving the damping ratio to ensure the response avoids frequencies that can cause damage to the aircraft engine 100.

Also in Equation 1, A is an initial amplitude of the response at an undamped condition (e.g., the response to the resonant vibration frequency without a damping ratio applied), e is an exponential function, $\omega$ is the resonant vibration frequency measured in Hertz (hz), t is a time after the initial amplitude impulse in seconds, $\alpha$ is a phase angle of the response in radians, and $\lambda$ is a decay rate calculated using the measured instantaneous vibration frequency ($\omega$) multiplied by the damping ratio (e.g., $\lambda=\omega*\zeta$). In the example of FIG. 2, the damping ratio is determined based on a target/desired response y(t).

Figure 3:
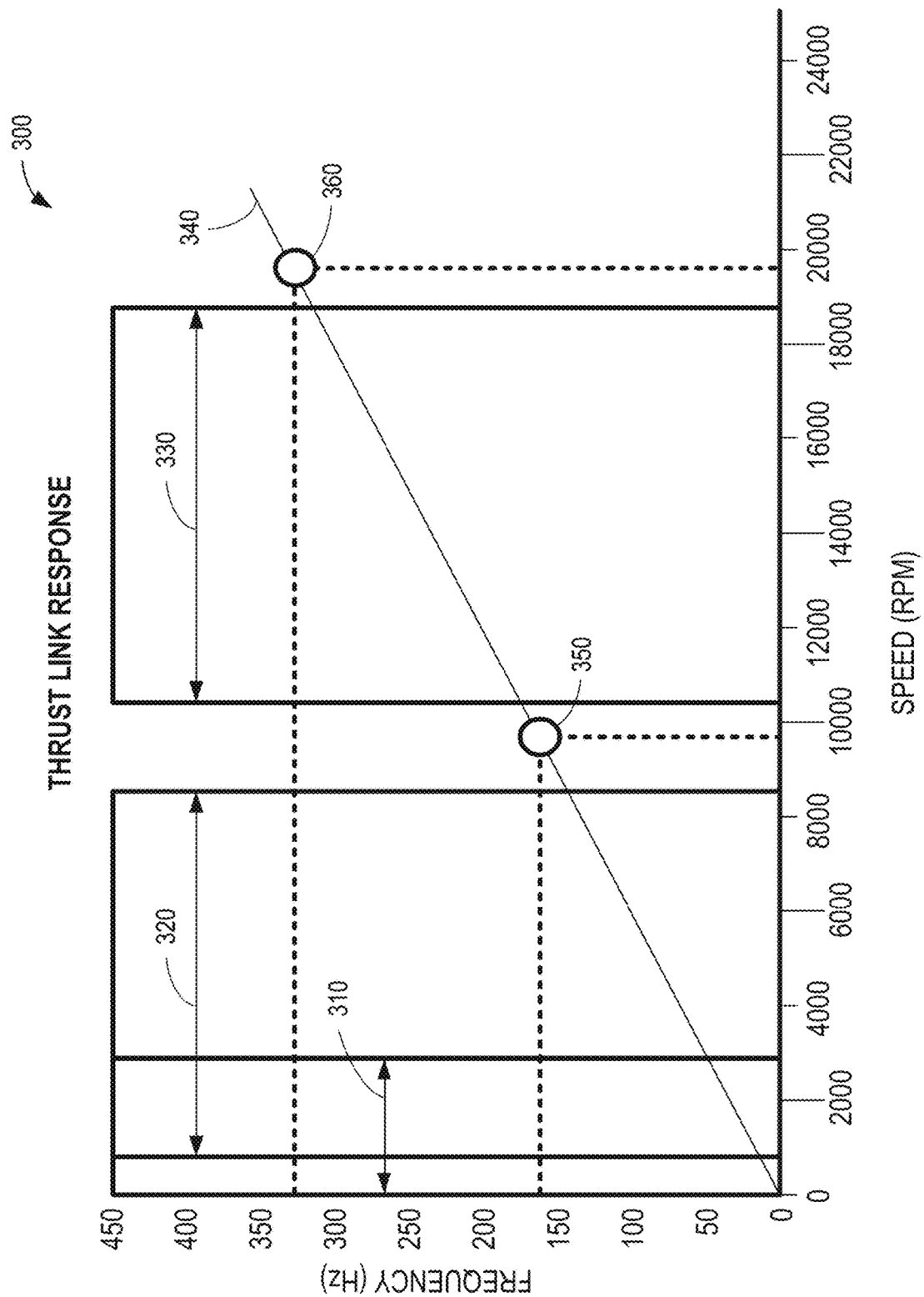
FIG. 3 is an example thrust link response graph depicting operating ranges for components within the gas turbine engine of FIGS. 1A and 1B.

FIG. 3 is an example thrust link response graph 300 depicting operating ranges for components within the turbofan engines 100, 101 of FIGS. 1A and 1B. The example thrust link response graph 300 includes an x-axis showing a speed of the component within the turbofan engines 100, 101 in revolutions per minute (RPM) and a y-axis showing a resonant vibration frequency generated by the turbofan engines 100, 101 in Hertz (Hz). In the example of FIG. 3, the fan section 106 has a first operating range 310 from 0 RPMs to approximately 3,000 RPMs, the LP turbine 120 has a second operating range 320 from approximately 1,000 RPMs to approximately 8,000 RPMs, the HP turbine 118 has a third operating range 330 from approximately 10,000 RPMs to approximately 18,000 RPMs.

As shown in FIG. 3, the example thrust link response graph 300 includes two modes along a thrust link frequency path 340 corresponding to the natural frequency response of the thrust link 170. The thrust link frequency path 340 is represented by a linear relationship between speeds of the components of the turbofan engines 100, 101 and a resonant vibration frequency generated at those speeds.

Along the thrust link frequency path 340 is a first mode 350 and a second mode 360. The first and second modes 350, 360 represent target frequency responses based on the operating speed of the turbofan engines 100, 101 (e.g., y(t) from Equation 1 above). The first mode 350 is outside of the operating range of the LP turbine 120 on the high end and outside of the operating range of the HP turbine 118 on the low end. The second mode 360 is outside of the operating range of the HP turbine 118 on the high end. Disclosed thrust defines a bumper distance percentage, which is a percentage of the total thrust link span (e.g., the span 178) from the aft end 174 at which the bumper 410 is placed. As such, the bumper distance 430 and the bumper distance percentage define a location at which the bumper 410 couples to the thrust link 170 in the form of a distance from the aft end 174.

In the examples disclosed herein, the range of values for the bumper distance percentage is between 10% and 30% of the total thrust link span 178 and $OD_1$ is between 2 inches (5.08 centimeters (cm)) and 7 inches (17.78 cm). The bumper span percentage can be adjusted to enable a target frequency to be achieved. In some examples, the outside diameter of the thrust link 170 is in a range of 2 inches (5.08 cm) to 7 inches (17.78 cm). In some examples, the outside diameter of the thrust link 170 is in a range of 3 inches (7.64 cm) to 4.5 inches (11.43 cm).

Table 1 below illustrates examples of bumper distance percentages, inside diameters, and outside diameters of the thrust link 170 that produce frequency responses (e.g., the first mode 350, the second mode 360) that are outside of the second operating range 320 of the LP turbine 120 and the third operating range 330 of the HP turbine 118.

TABLE 1

| Par.: | Ex. 1 | Ex. 2 | Ex. 3 | Ex. 4 | Ex. 5 | Ex. 6 | Ex. 7 | Ex. 8 | Ex. 9 | Un. |
|---|---|---|---|---|---|---|---|---|---|---|
| BD % | 20 | 20 | 30 | 10 | 20 | 30 | 10 | 20 | 30 | % |
| ID | 3 | 3.5 | 3.5 | 4 | 4 | 4 | 4.5 | 4.5 | 4.5 | in. |
| OD | 3.16 | 3.66 | 3.66 | 4.16 | 4.16 | 4.16 | 4.66 | 4.66 | 4.66 | in. |
| N1 | 8,886.6 | 9,096.6 | 10,965 | 8,083.2 | 9,330.6 | 10,798.8 | 8,757 | 9,679.8 | 10,757.4 | RPM |
| N2 | 25,477.8 | 26,955 | 27,129.6 | 28,342.8 | 28,505.4 | 28,395 | 31,183.2 | 31,869 | 33,276 | RPM | link designs have a first mode and second mode outside of the operating ranges 320, 330 of the HP turbine 118 and the LP turbine 120.

Thrust Link with Variable Internal and External Geometry

Figure 4A:
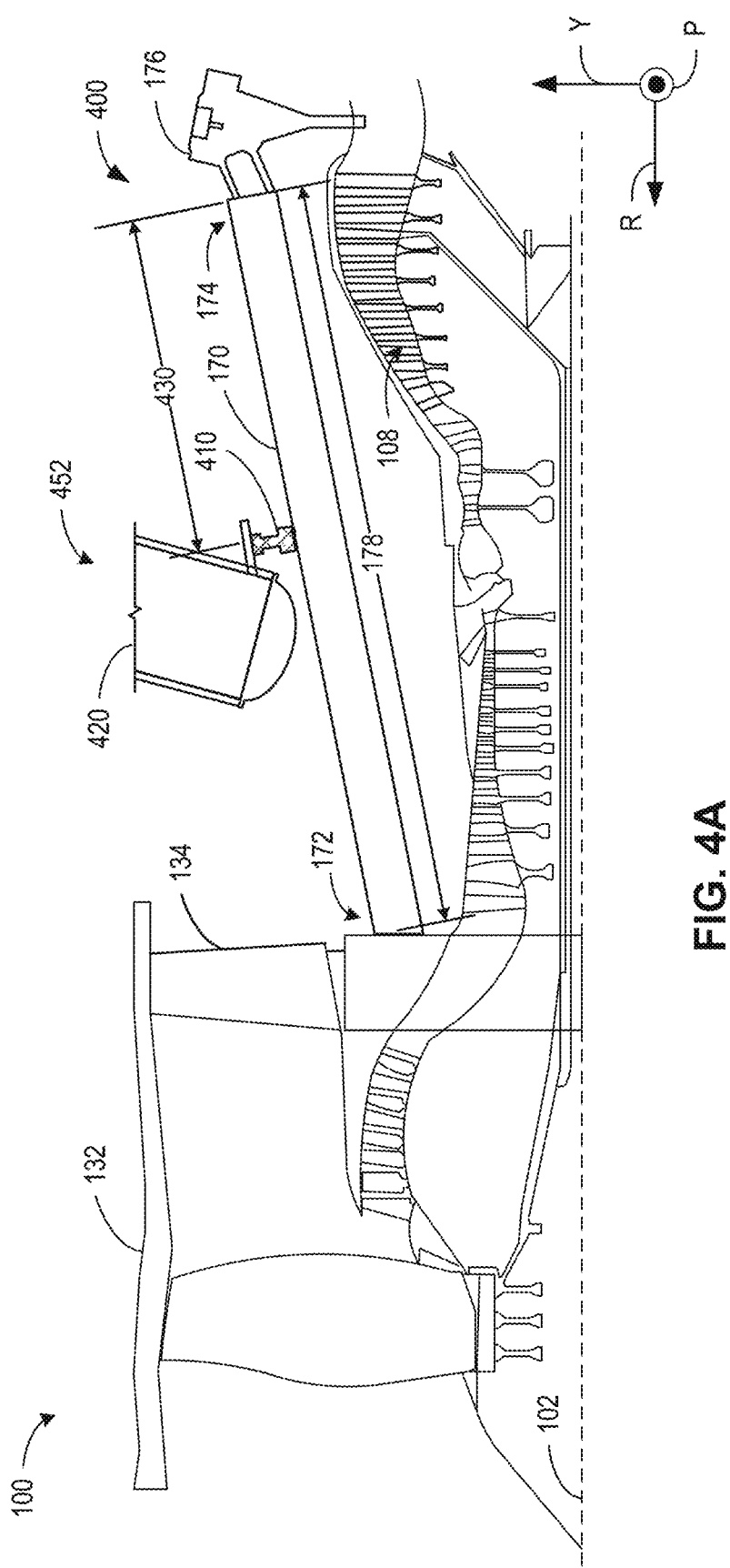
FIG. 4A is a view of the top half of the cross-sectional view of FIG. 1A illustrating a first thrust link system.

FIG. 4A is a cross-sectional view of the aircraft engine 100 including a first example thrust link system 400. In the example of FIG. 4A, the top half of the aircraft engine 100 is shown (e.g., in the positive y-axis direction from the axial centerline axis 102). The aircraft engine 100 of FIG. 4A includes the thrust link 170 coupled to the aircraft engine 100 at the forward end 172 and at the aft end 174. The example of FIG. 4A shows the aft end 174 of the thrust link 170 coupled to the aft thrust link connector 176. Although the aft thrust link connector 176 is coupled to the aircraft engine 100, it should be understood that the aft thrust link connector 176 can alternatively be coupled to the pylon 180 (FIG. 1B) the example thrust link system 400. That is, although discussed in the context of the aircraft engine 100 of FIG. 1A, the thrust link system 400 can be utilized with the turbofan engine 101 of FIG. 1B in which the aft end 174 couples to the pylon 180 as opposed to the tubular outer casing 108 (FIGS. 1A and 1B).

The first example thrust link system 400 includes the span 178 and a bumper 410 coupled to surrounding engine hardware 420. The bumper 410 can include a metal, a composite, an elastomer, and/or a fluorocarbon. In examples disclosed herein, the surrounding engine hardware 420 can be implemented by the annular fan casing 132 of FIGS. 1A-1B, a nacelle, the pylon 180 of FIG. 1B, and/or an aircraft associated with the aircraft engine 100, 101. In the example of FIG. 4A, the placement (e.g., a position) of the bumper 410 along the thrust link span 178 defines a bumper distance 430 relative to the aft end 174 of the thrust link 170. The bumper distance 430 relative to the thrust link span 178

In Table 1 above, "Par." represents the term "parameter," "BD %" represents the bumper distance percentage for the thrust link 170, "ID" represents the inner diameter of the thrust link 170, "OD" represents the outer diameter of the thrust link 170, "N1" represents modal responses by the thrust link 170 to frequencies encountered in the first mode 350, "N2" represents modal responses by the thrust link 170 to frequencies encountered in the second mode 360, "Ex." represents the term "example," and "Un." represents the term "units." Based on the design space of embodiments that the inventors created, unique relationships with respect to frequency response were determined, as represented in an Expression (1), referred to herein as "EQ1", and an Expression (2) referred to herein as "EQ2." The ranges associated with EQ1 and EQ2 identify frequency responses (e.g., the first mode 350, the second mode 360) that are outside of the second operating range 320 of the LP turbine 120 and the third operating range 330 of the HP turbine 118.

The Expression (1) is defined as:

$$EQ1 = OD(\text{in.}) + \frac{\text{Bumper distance pct (\%)}}{10} \quad (1)$$

The Expression (2) is defined as:

$$EQ2 = OD(\text{in.}) - \frac{\text{Bumper distance pct (\%)}}{5} \quad (2)$$

Values for the Expression (1) and the Expression (2) for each of the examples of Table 1 are shown in Table 2.

TABLE 2

| Par.: | Ex. 1 | Ex. 2 | Ex. 3 | Ex. 4 | Ex. 5 | Ex. 6 | Ex. 7 | Ex. 8 | Ex. 9 | Un. |
|---|---|---|---|---|---|---|---|---|---|---|
| BD % | 20 | 20 | 30 | 10 | 20 | 30 | 10 | 20 | 30 | % |
| ID | 3 | 3.5 | 3.5 | 4 | 4 | 4 | 4.5 | 4.5 | 4.5 | in. |
| OD | 3.16 | 3.66 | 3.66 | 4.16 | 4.16 | 4.16 | 4.66 | 4.66 | 4.66 | in. |
| N1 | 8,886.6 | 9,096.6 | 10,965 | 8,083.2 | 9,330.6 | 10,798.8 | 8,757 | 9,679.8 | 10,757.4 | RPM |
| N2 | 25,477.8 | 26,955 | 27,129.6 | 28,342.8 | 28,505.4 | 28,395 | 31,183.2 | 31,869 | 33,276 | RPM |
| EQ1 | 5.16 | 5.66 | 6.66 | 5.16 | 6.16 | 7.16 | 5.66 | 6.66 | 7.66 | n/a |
| EQ2 | −0.84 | −0.34 | −2.34 | 2.16 | 0.16 | −1.84 | 2.66 | 0.66 | −1.34 | n/a |

It was found that the range of values for Expression (1) and Expression (2) define thrust link configurations that produce frequency responses that satisfy the frequency ranges encountered in the first mode 350 and the second mode 360. While narrowing these multiple factors to a region of possibilities saves time, money, and resources, the largest benefit is at the system level, where the frequency responses by the example thrust links (e.g., example configurations of the thrust link 170). A (i) design range for Expression (1) of greater than or equal to 5.16 and less than or equal to 7.66 and (ii) a design range for Expression (2) of greater than or equal to −2.44 and less than or equal to 2.66 results in the thrust link 170 having frequency responses (e.g., the first mode 350, the second mode 360) that are outside of the second operating range 320 of the LP turbine 120 and the third operating range 330 of the HP turbine 118 such that the turbofan engines 100, 101 can withstand resonant vibration frequencies that would otherwise damage the turbofan engines 100, 101.

In some examples, the first example thrust link system 400 implements means for withstanding the resonant vibration frequency generated by the aircraft engine 100.

Figure 4B:
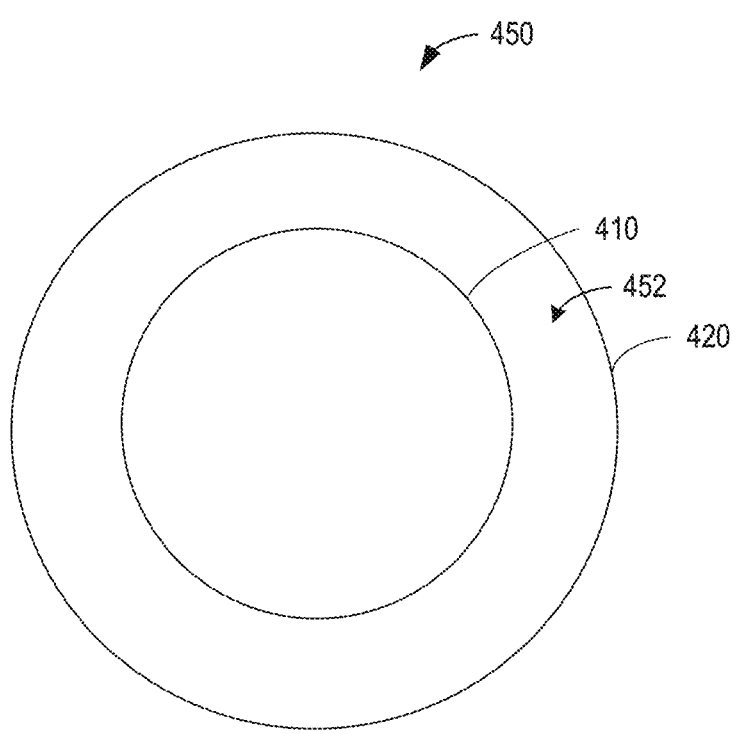
FIG. 4B is a cross-sectional view of an example multi-directional bumper of the first thrust link system of FIG. 4A.

FIG. 4B is a cross-sectional view of an example interface 450 between the bumper 410 and the surrounding engine hardware 420 of the thrust link system 400 of FIG. 4A. The surrounding engine hardware 420 includes an orifice 452 through which the bumper 410 is inserted. The orifice 452 includes a diameter greater than a diameter of the bumper 410. As such, deflection of the bumper 410 and, in turn, the thrust link 170 is enabled in a limited manner (e.g., limited to a difference between the diameters) in an axial direction (e.g., along the r-axis of FIG. 4A) and a circumferential direction (e.g., along the p-axis of FIG. 4A). In some examples, a first portion (e.g., an outer radial portion) of the bumper 410 and a second portion (e.g., an inner radial portion) of the bumper 410 on opposite sides of the orifice 452 have a greater diameter than a third portion of the bumper 410 that extends through the orifice 452. In some examples, the first portion and/or the second portion of the bumper 410 are separated from the surrounding engine hardware 420 by a distance to enable deflection in a radial direction (e.g., along the y-axis).

Figure 5:
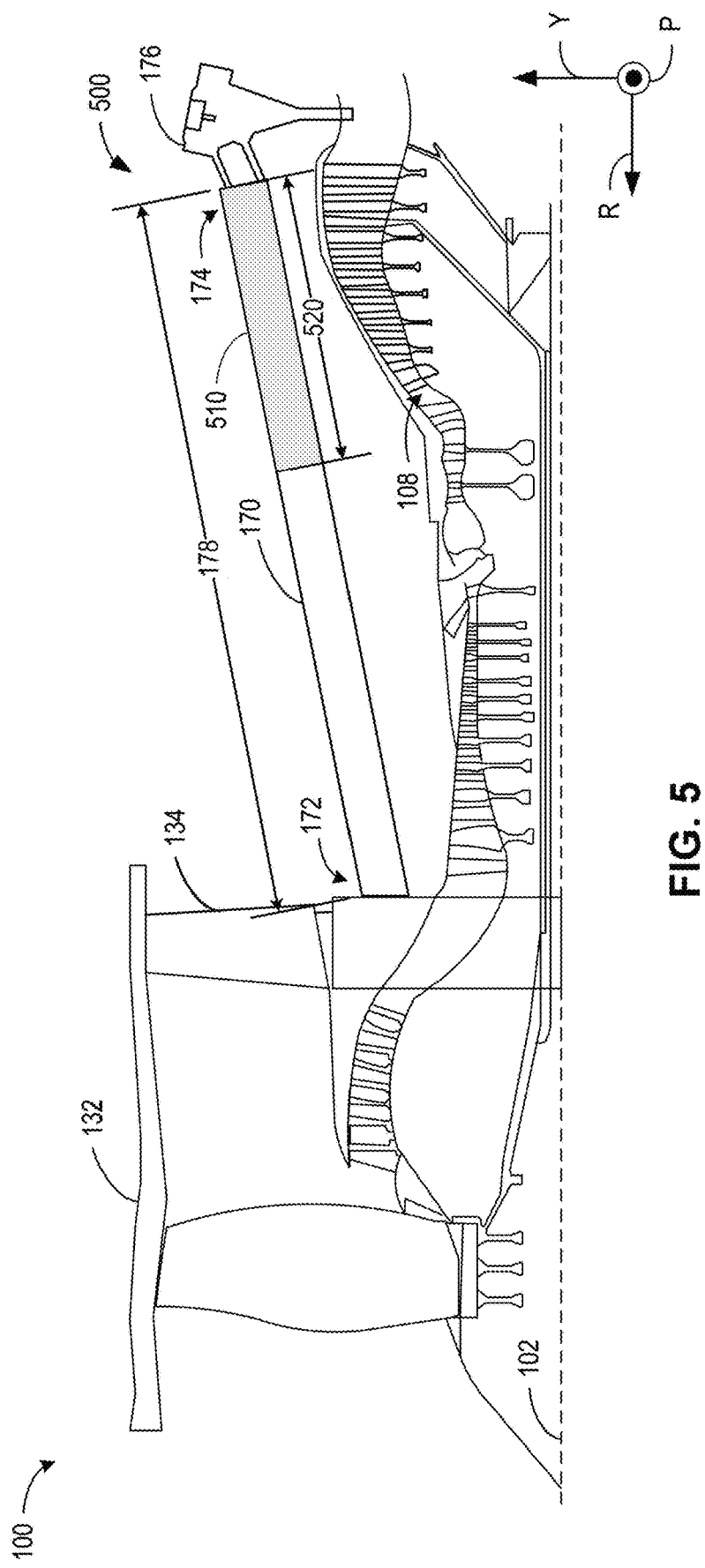
FIG. 5 is a view of the top half of the cross-sectional view of FIG. 1A illustrating a second example thrust link system.

FIG. 5 is a cross-sectional view of the aircraft engine 100 including a second example thrust link system 500. In the example of FIG. 5, the top half of the aircraft engine 100 is shown (e.g., in the positive y-axis direction from the axial centerline axis 102). The aircraft engine 100 of FIG. 5 includes the thrust link 170 coupled to the aircraft engine 100 at the forward end 172 and at the aft end 174. The example of FIG. 4A shows the aft end 174 of the thrust link 170 coupled to the aft thrust link connector 176. Although the aft thrust link connector 176 is coupled to the aircraft engine 100, it should be understood that the aft thrust link connector 176 can alternatively be coupled to the pylon 180 (FIG. 1B) the example thrust link system 400. That is, although discussed in the context of the aircraft engine 100 of FIG. 1A, the thrust link system 400 can be utilized with the turbofan engine 101 of FIG. 1B in which the aft end 174 couples to the pylon 180 as opposed to the tubular outer casing 108 (FIGS. 1A and 1B).

The second example thrust link system 500 includes the span 178 and a damping insert 510 (e.g., a thrust link insert). The damping insert 510 is inserted inside the thrust link 170 or wraps around an outside (e.g., an outer surface) of the thrust link 170. The damping insert 510 can be used to define a frequency response to the frequencies generated by the operation of the aircraft engine 100. Specifically, the damping insert 510 can be utilized to change an end point mass of the thrust link 170, which adjusts the frequency response of the thrust link 170, as represented by Equation 2 below:

$$\omega = \sqrt{K/m} \qquad \text{Equation 2}$$

In Equation 2 above, the frequency response is represented by @, a stiffness factor of the thrust link 170 is represented by K, and a mass of the thrust link 170 and the damping insert 510 is represented by m. The damping insert 510 can provide vibration damping and/or increase the stiffness of the thrust link 170 with a reduced weight addition compared to an extension of the thrust link 170 occupying the same volume. The damping insert 510 can be formed of rubber, plastic, foam, metal, etc. In some examples, the damping insert 510 is a metal foam. The damping insert 510 has a damping insert span 520 corresponding to a length of the thrust link 170 into which the damping insert 510 extends from the aft end 174. A function can be used to represent an idealized ratio of span 178 to damping insert span 520, represented by Equation 3 below:

$$\text{Insert Ratio} = \frac{\text{Damping Insert Span Length}}{\text{Thrust link Span Length}}. \qquad \text{Equation 3}$$

In Equation 3 above, the insert ratio has a range of 0.25 to 0.5, meaning that the target frequency response to the aircraft engine 100 is achieved when the damping insert span 520 is roughly between 25% and 50% of the total length of the thrust link 170. Although the damping insert 510 is shown to be at the aft end 174 of the thrust link 170 in the example of FIG. 5, the damping insert 510 can also be positioned at the forward end 172.

In some examples, the second example thrust link system 500 implements means for withstanding the resonant vibration frequency generated by the aircraft engine 100.

In some examples, the targeting of the first and second modes 350, 360 cannot occur outside of the operating range of the LP turbine 120 and the HP turbine 118, respectively. In such a scenario where the modal responses fall within the operating range of the LP turbine 120 and the HP turbine 118 (e.g., the modal responses do not cover the entire operating ranges of the respective turbines), the thrust link 170 may be equipped with external features to attempt to average the frequency responses across the operating range of the aircraft engine 100 (e.g., to compensate by targeting modes that fall within the operating range of the turbines 118, 120).

Figure 6:
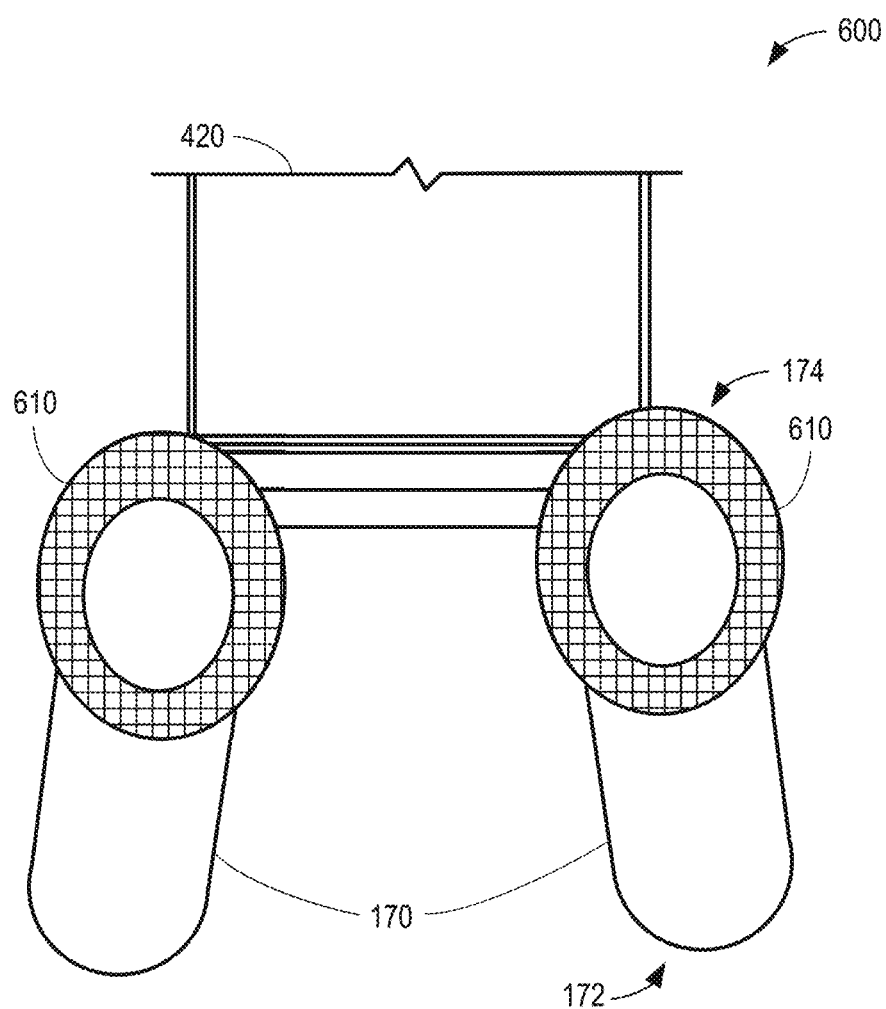
FIG. 6 is an axial view of the thrust link of FIGS. 1A and/or 1B illustrating a third example thrust link system.

FIG. 6 is a view of the thrust link 170 looking axially forward (e.g., along the positive R-axis). The surrounding engine hardware 420 is shown to orient the view of FIG. 6. In the example of FIG. 6, the thrust link 170 is coupled to the surrounding engine hardware 420.

The example of FIG. 6 shows a third example thrust link system 600 which includes an external damper 610 oriented to surround the aft end 174 of the thrust link 170. In examples disclosed herein, the external damper 610 is made of metal, foam, plastic, etc.

In some examples, the third example thrust link system 600 implements means for withstanding the resonant vibration frequency generated by the aircraft engine 100.

Although the example thrust link systems of FIGS. 4A-6 are shown independently, any combination of the arrangements of FIGS. 4A-6, along with any additional example disclosed herein may be used to target the first and second modes 350, 360 in the target range.

Thrust Link with Variable Diameters

Figure 7:
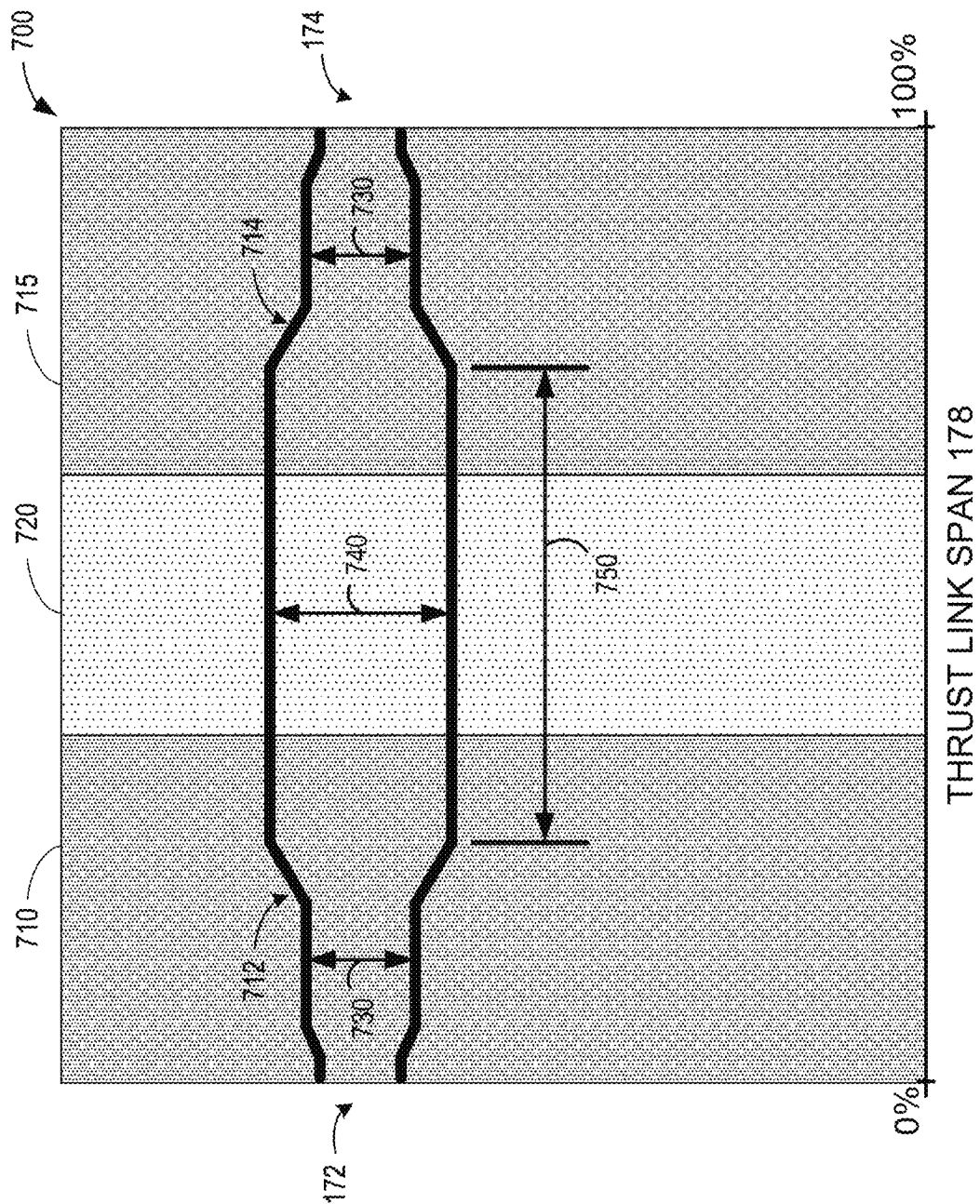
FIG. 7 is cross-sectional view of the thrust links of FIGS. 1A-1B and/or 4-6 illustrating a first thrust link geometric orientation.

FIG. 7 is a cross-sectional view of the thrust link 170 of any of the examples of FIGS. 1A-1B and/or FIGS. 4A-6. The example of FIG. 7 includes a first thrust link geometric orientation 700. The example of FIG. 7 includes a first region 710 (e.g., a first stiff region), a second region 715 (e.g., a second stiff region), and a center region 720 (e.g., a center stiff region). In the illustrated example of FIG. 7, the first region 710, the second region 715, and the center region 720 are included so as to provide structural rigidity to the thrust link 170, thus allowing the thrust link 170 to transfer thrust loads without failing (e.g., cracking/breaking).

In the illustrated example of FIG. 7, the first region 710 spans from approximately 0% of the span 178 to approximately 40% of the span 178, where 0% is equal to (e.g., representative of) the connection point of the forward end 172 of the thrust link 170 to the aircraft engine 100 and 100% is equal to (e.g., representative of) the connection point of the aft end 174 of the thrust link 170 to the aircraft engine 100, the pylon 180, or the aircraft. The second region 715 spans from approximately 60% of the span 178 to approximately 100% of the span 178. The center region 720 spans the difference between the first region 710 and the second region 715, or from approximately 40% of the span 178 to approximately 60% of the span 178. Although these may be idealized numbers, the span percentages can be modified to accommodate different structural orientations of the thrust link 170 as disclosed herein. These ranges are to indicate that the exact number may fall between those ranges to impact the target frequency response within the aircraft engine 100.

The first thrust link geometric orientation 700 of FIG. 7 includes an end diameter 730 (e.g., an end outer diameter, an outer diameter of an axially outer portion of the thrust link span 178) and a center diameter 740 (e.g., a center outer diameter). In the example of FIG. 7, within the thrust link span 178, the center diameter 740 spans a center diameter length 750. The first thrust link geometric orientation 700 is tapered from the end diameter 730 into the center diameter 740 within the first region 710 and the second region 715. As such, at least a portion of the first region 710 defines a first transition 712 between the end diameter 730 and the center diameter 740, and at least a portion of the second region 715 defines a second transition 714 between the end diameter 730 and the center diameter 740. The transitions 712, 714 (e.g., the tapers) begin and end within the first and second regions 710, 715, which ensures that the center region 720 has a greater stiffness than the first region 710 and the second region 715. Specifically, the difference in stiffness between the first region 710, the second region 715, and the center region 720 is a result of a difference in a moment of inertia (MoI) between the regions, which can be calculated using Equation 4 below.

$$MoI = \pi/64 * (OD^4 - ID^4); \quad \text{Equation 4}$$

Thus, with the thickness of (e.g., a wall thickness in) the first region 710, the second region 715, and the center region 720 remaining constant, as the outer diameter of the regions 710, 715, 720 increases, the stiffness of the regions 710, 715, 720 increases. The thickness of the first region 710, the second region 715, and the center region 720 can be adjusted independent of the end diameter 730 and the center diameter 740 based on the target modal response. Additionally, as the center region 720 occupies an increasing percentage of the span 178, the stiffness of the thrust link 170 increases, which increases the vibration frequency. Accordingly, different ratios of length between the center region 720 and the first and second regions 710, 715 result in different vibration frequencies, which can impact stability, performance, and integrity of the thrust link 170, for example.

In the example of FIG. 7, the end diameter 730 has a range of 2 inches (5.08 cm) to 7 inches (17.78 cm), the center diameter 740 has a range of 3.5 inches (8.89 cm) to 6 inches (15.24 cm), and the center diameter length 750 has a range of 10 inches (25.4 cm) to 30 inches (76.2 cm). In some examples, the end diameter 730 has a range of 3 inches (7.62 cm) to 4.5 inches (11.43 cm). In some examples, the center diameter 740 has a range of 4 inches (10.16 cm) to 5.5 inches (13.97 cm). In some examples, the center diameter length 750 has a range of 15 inches (38.1 cm) to 27 inches (68.58 cm). As the center diameter length 750 increases, the modal responses N1 and N2 increases for the range of the relative OD. This enables precise placement of the N1 and N2 responses.

The center diameter length 750 defines a center diameter span percentage (e.g., a percentage of the thrust link span 178 occupied by the center diameter length 750) that extends from (i) a location equivalent to or between 5% and 20% of the thrust link span 178 to (ii) a location equivalent to or between approximately 80% and 95% of the thrust link span 178. As such, the center diameter span percentage is equivalent to or between approximately 60% and approximately 90% of the thrust link span 178. Table 3 below illustrates examples of the center diameter span percentage, the end diameter 730, and the center diameter 740 that produce frequency responses (e.g., the first mode 350, the second mode 360) that are outside of the second operating range 320 of the LP turbine 120 and the third operating range 330 of the HP turbine 118.

TABLE 3

| Par.: | Ex. 1 | Ex. 2 | Ex. 3 | Ex. 4 | Ex. 5 | Ex. 6 | Ex. 7 | Ex. 8 | Ex. 9 | Un. |
|---|---|---|---|---|---|---|---|---|---|---|
| CDS % | 90 | 90 | 90 | 80 | 80 | 80 | 70 | 70 | 60 | % |
| EOD | 3.66 | 3.16 | 4.16 | 3.66 | 3.16 | 4.16 | 3.16 | 4.16 | 4.16 | in. |
| COD | 4.56 | 5.06 | 5.06 | 4.56 | 5.06 | 5.06 | 5.06 | 5.06 | 5.06 | in. |
| N1 | 8,163.6 | 9,010.2 | 9,004.8 | 8,023.8 | 8,770.2 | 8,830.8 | 8,275.8 | 8,554.8 | 8,201.4 | RPM |
| N2 | 30,379.2 | 33,150.6 | 33,076.2 | 28,768.2 | 30,495.6 | 31,134 | 26,749.2 | 28,941.6 | 27,144.6 | RPM |

In Table 3 above, "Par." represents the term "parameter," and "CDS %" represents the center diameter span percentage (e.g., a percentage of the thrust link span 178 occupied by the center diameter length 750). Specifically, "CDS %" can be calculated using Equation 5 below.

$$CDS \% = \frac{\text{center diameter length 750}}{\text{thrust link span 178}} \quad \text{Equation 5}$$

Further, "EOD" represents the end diameter 730 (e.g., the end outer diameter), "COD" represents the center diameter 740 (e.g., the center outer diameter), "N1" represents a specific frequency response by the thrust link 170 to a vibration frequency encountered in the first mode 350, "N2" represents a specific frequency response by the thrust link 170 to a vibration frequency encountered in the second mode 360, "Ex." represents the term "example," and "Un." represents the term "units." Based on the design space of embodiments created by the inventors and reflected in Table 3, unique relationships with respect to frequency response are reflected in an Expression (3), referred to herein as "EQ3." The range associated with EQ3 identifies thrust link designs with modes that fall outside of the second operating range 320 of the LP turbine 120 and the third operating range 330 of the HP turbine 118. In Expression (3), the center diameter span percentage (CDS %) is represented as the whole number associated with the percentage (i.e., not a decimal representative of the percentage). That is, in Expression (3), a center diameter span percentage (CDS %) of 90% is represented as 90 and not 0.90.

The Expression (3) is defined as:

$$EQ3 = \left(\frac{COD(\text{in.})}{EOD(\text{in.})}\right) - 0.00065876152832674 * (COD(\text{in.}) * CDS \%(\%))^2 + 0.53333333333333 * (COD(\text{in.}) * (CDS \%(\%) * 100)) \quad (3)$$

Values for the Expression (3) for each of the examples shown in Table 3 are shown in Table 4.

region of possibilities saves time, money, and resources, the largest benefit is at the system level, where the frequency responses by the example thrust links (e.g., example configurations of the thrust link 170). A design range for Expression (3) of greater than or equal to 122.2495 and less than or equal to 128.9963 describes the thrust link 170 having frequency responses (e.g., the first mode 350, the second mode 360) that are outside of the second operating range 320 of the LP turbine 120 and the third operating range 330 of the HP turbine 118 and can withstand resonant vibration frequencies that would otherwise damage the turbofan engines 100, 101.

In some examples, the first thrust link geometric orientation 700 implements means for withstanding the resonant vibration frequency generated by the aircraft engine 100.

Figure 8:
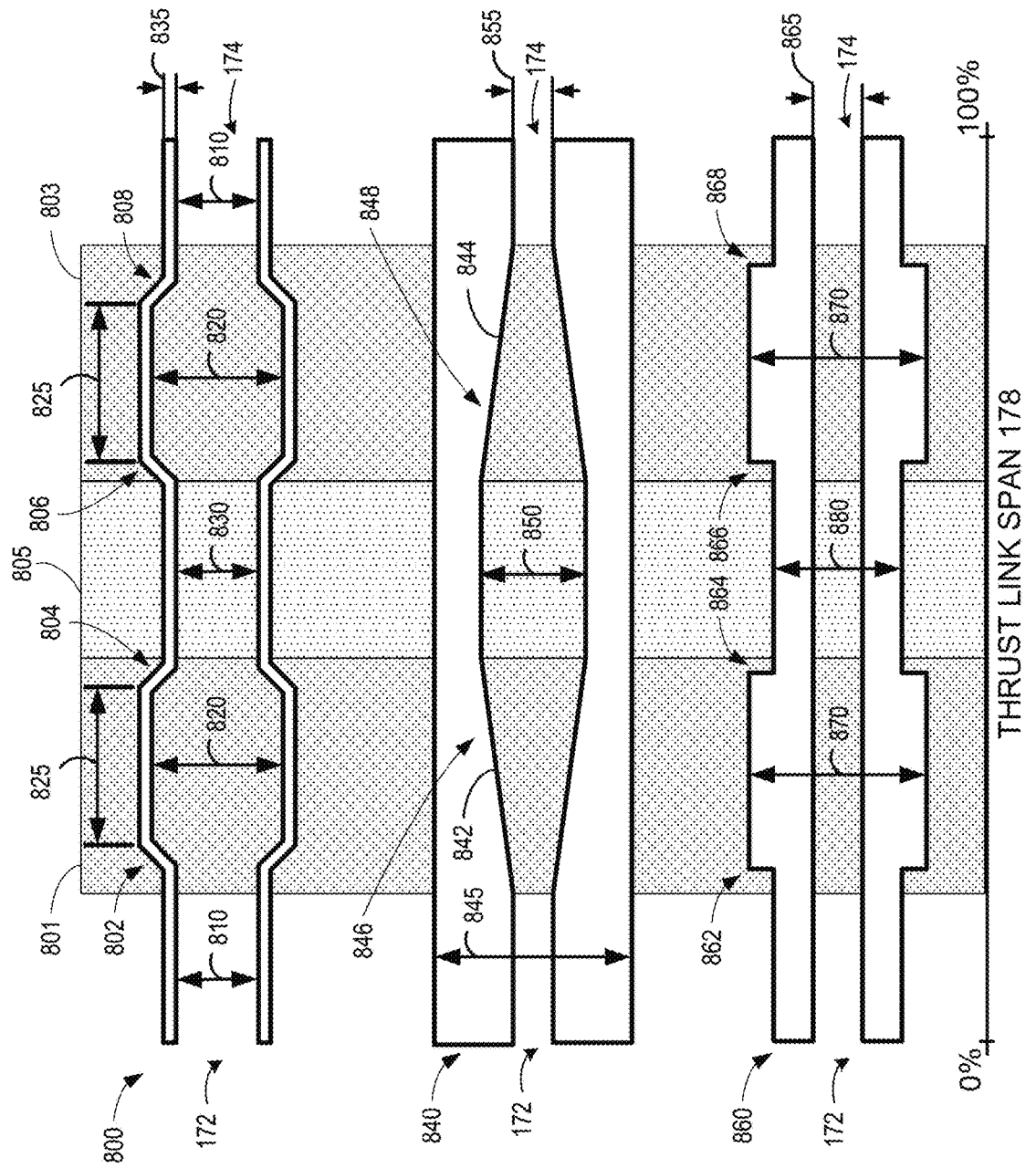
FIG. 8 is a cross-sectional view of the thrust links of FIGS. 1A-1B and/or 4-6 illustrating second, third, and fourth thrust link geometric orientations that can be interchangeably used or combined with the first thrust link geometric orientation of FIG. 7.

FIG. 8 shows additional example thrust link geometric orientations that can be interchangeably used or combined with the first thrust link geometric orientation 700 of FIG. 7 to provide structural rigidity to the thrust link 170, thus allowing the thrust link 170 to transfer thrust loads without failing (e.g., cracking/breaking). The example of FIG. 8 shows three additional/alternative thrust link geometric orientations 800, 840, 860.

The example of FIG. 8 includes a first region 801 (e.g., a first stiff region), a second region 803 (e.g., a second stiff region), and a center region 805 (e.g., a center stiff region). In the illustrated example of FIG. 8, the first region 801, the second region 803, and the center region 805 are included so as to provide structural rigidity to the thrust link 170, thus allowing the thrust link 170 to transfer thrust loads without failing (e.g., cracking/breaking). In the illustrated example of FIG. 8, the first region 801 spans from approximately 10% of the span 178 to approximately 40% of the span 178, where 0% is equal to (e.g., representative of) the connection point of the forward end 172 of the thrust link 170 to the aircraft engine 100 and 100% is equal to (e.g., representative of) the connection point of the aft end 174 of the thrust link 170 to the aircraft engine 100, the pylon 180, or the aircraft. The second region 803 spans from approximately 60% of the span 178 to approximately 90% of the span 178. The center region 805 spans the difference between the first region 801 and the second region 803, or from approximately 40% of the span 178 to approximately 60% of the

TABLE 4

| Par.: | Ex. 1 | Ex. 2 | Ex. 3 | Ex. 4 | Ex. 5 |
|---|---|---|---|---|---|
| CDS % | 90 | 90 | 90 | 80 | 80 |
| EOD | 3.66 | 3.16 | 4.16 | 3.66 | 3.16 |
| COD | 4.56 | 5.06 | 5.06 | 4.56 | 5.06 |
| N1 | 8,163.6 | 9,010.2 | 9,004.8 | 8,023.8 | 8,770.2 |
| N2 | 30,379.2 | 33,150.6 | 33,076.2 | 28,768.2 | 30,495.6 |
| EQ3 | 124.6156079 | 122.2496 | 127.3096 | 123.5822482 | 123.9362667 |

| Par.: | Ex. 6 | Ex. 7 | Ex. 8 | Ex. 9 | Un. |
|---|---|---|---|---|---|
| CDS % | 80 | 70 | 70 | 60 | % |
| EOD | 4.16 | 3.16 | 4.16 | 4.16 | in. |
| COD | 5.06 | 5.06 | 5.06 | 5.06 | in. |
| N1 | 8,830.8 | 8,275.8 | 8,554.8 | 8,2014. | RPM |
| N2 | 31,134 | 26,749.2 | 28,941.6 | 27,144.6 | RPM |
| EQ3 | 128.9962667 | 122.2496 | 127.3096 | 122.2496 | n/a |

It was found that the range of values for Expression 3 correlates to thrust link configurations that produce frequency responses (e.g., the first mode 350, the second mode 360) that are outside of the second operating range 320 of the LP turbine 120 and the third operating range 330 of the HP turbine 118. While narrowing these multiple factors to a span 178. Although these may be idealized numbers, the span percentages can be modified to accommodate different structural orientations of the thrust link 170 as disclosed herein. These ranges are to indicate that the exact number may fall between those ranges to impact the target frequency response within the aircraft engine 100.

A second thrust link geometric orientation 800 is shown in FIG. 8 including a first diameter 810, a second diameter 820, a second diameter length 825, a third diameter 830, and a thrust link wall thickness 835. In the second thrust link geometric orientation 800 of FIG. 8, at least a portion of thrust link 170 having the first diameter 810 is outside of the first and second regions 801, 803 (e.g., between the forward end 172 up to approximately 10% of the span 178 of the thrust link 170 and between approximately 90% of the span 178 of the thrust link 170 to the aft end 174). In some examples, the first diameter 810 is approximately 3.5 inches (8.89 cm).

The second diameter 820 of the second thrust link geometric orientation 800 is within the first and second regions 801, 803. Specifically, in the second thrust link geometric orientation 800, the first region 801 defines a first transition 802 between the first diameter 810 and the second diameter 820 (e.g., from the first diameter 810 to the second diameter 820 when moving towards the aft end 174) and a second transition 804 between the second diameter 820 and the third diameter 830 (e.g., from the second diameter 820 to the third diameter 830 when moving towards the aft end 174). Similarly, the second region 803 defines a third transition 806 between the third diameter 830 and the second diameter 820 (e.g., from the third diameter 830 to the second diameter 820 when moving towards the aft end 174) and a fourth transition 808 between the second diameter 820 and the first diameter 810 (e.g., from the second diameter 820 to the first diameter 810 when moving towards the aft end 174). The second diameter length 825 is defined by how long the second diameter 820 spans within the first and second regions 801, 803. In some examples, the second diameter 820 is approximately 5 inches (12.7 cm) and the second diameter length 825 is approximately 15 inches (38.1 cm).

The third diameter 830 of the second thrust link geometric orientation 800 is within the center region 805. In the example of FIG. 8, the third diameter 830 of the second thrust link geometric orientation 800 is equal to the first diameter 810. In some examples, however, the third diameter 830 may be different than the first diameter 810. For example, the third diameter 830 can be between the first diameter 810 and the second diameter 820. In some examples, the third diameter 830 is different than the first diameter 810 when there is a space constraint, which can result from surrounding engine hardware, for example.

The second thrust link geometric orientation 800 includes a thrust link wall thickness 835 that is uniform (e.g., non-changing) across an entirety of the thrust link span 178. In some examples, the thrust link wall thickness 835 is 0.1 inches (0.254 cm). In some examples, the thrust link wall thickness 835 is non-uniform, which may be desired based on the modal responses used to dissipate/counter the resonant vibration frequencies produced by the aircraft engine 100. In such examples, when the thrust link wall thickness 835 is non-uniform, the thrust link wall thickness 835 can include a taper that achieves a desired structural function (e.g., buckling in a potential failure scenario) in addition to a modal response target. For example, reducing the thrust link wall thickness 835 in the center region 805 can provide a higher response frequency than when the thrust link wall thickness 835 is uniform across the thrust link span 178.

In some examples, the second thrust link geometric orientation 800 implements means for withstanding the resonant vibration frequency generated by the aircraft engine 100.

Also in the example of FIG. 8 is a third thrust link geometric orientation 840. The third thrust link geometric orientation 840 includes a uniform outer diameter 845, a first diameter 850, and a second diameter 855. The first diameter 850 of the third thrust link geometric orientation 840 is within (e.g., spans) the center region 805. Specifically, the first diameter 850 spans from a transition point between the first region 801 and the center region 805 to a transition point between the center region 805 and the second region 803. The second diameter 855 of the third thrust link geometric orientation 840 is extending (i) from the forward end 172 to approximately 10% of the span 178 and (ii) from approximately 90% of the span 178 to the aft end 174. The third thrust link geometric orientation 840 includes a first taper 842 in the first region 801 and a second taper 844 in the second region 803. Specifically, the first taper 842 defines a first transition 846 from the second diameter 855 at approximately 10% of the span 178 (e.g., at a location that is approximately 10% of the span 178 from the forward end 172) to the first diameter 850 at approximately 40% of the span 178 (e.g., at a location that is approximately 40% of the span 178 from the forward end 172). The second taper 844 defines a second transition 848 from the first diameter 850 at approximately 60% of the span 178 (e.g., at a location that is approximately 60% of the span 178 from the forward end 172) to the second diameter 855 at approximately 90% of the span 178 (e.g., at a location that is approximately 90% of the span 178 from the forward end 172). The placement and/or angle of the tapers 842, 844 between the first diameter 850 and the second diameter 855 is variable and may change based on the target modal response. For example, the placement and/or angle of the tapers 842, 844 can be adjusted to meet a desired static functionality (e.g., buckling in a potential failure scenario) and the modal responses of the first mode N1 and the second mode N2. In some examples, the uniform outer diameter 845 is between 3.0 inches (7.62 cm) and 6.0 inches (15.24 cm). In some examples, the first diameter 850 ranges from 2.84 inches (7.21 cm) to 5.84 inches (14.83 cm). A wall thickness radially outward from the first diameter 850 (e.g., a distance between the uniform outer diameter 845 and the first diameter 850) can range from 0.08 inches (0.20 cm) to 0.50 inches (1.27 cm). In some examples, the second diameter 855 ranges from 2.75 inches (6.99 cm) to 5.5 inches (14 cm). In some examples, the third thrust link geometric orientation 840 implements means for withstanding the resonant vibration frequency generated by the aircraft engine 100.

The example of FIG. 8 also includes a fourth thrust link geometric orientation 860. The fourth thrust link geometric orientation 860 includes a uniform inner diameter 865, a first thickness 870 (e.g., a first outer diameter) and a second thickness 880 (e.g., a second outer diameter). The first thickness 870 is greater than the second thickness 880. The first thickness 870 of the fourth thrust link geometric orientation 860 is positioned in the first and second regions 801, 803, which are thus the thickest portions of the fourth thrust link geometric orientation 860. The second thickness 880 is within the center region 805 and corresponds to the lowest ratio of mass per inch of length. In the example of FIG. 8, the forward end 172 and the aft end 174 of the fourth thrust link geometric orientation 860 have the same thickness as the second thickness 880. Specifically, the first region 801 defines a first transition 862 between the first thickness 870 and the second thickness 880 (e.g., from the first thickness 870 to the second thickness 880 when moving towards the aft end 174) and a second transition 864 between the first thickness 870 and the second thickness 880 (e.g., from the second thickness 880 to the first thickness 870 when moving towards the aft end 174). The second region 803 defines a third transition 866 between the first thickness 870 and the second thickness 880 (e.g., from the second thickness 880 to the first thickness 870 when moving towards the aft end 174) and a fourth transition 868 between the first thickness 870 and the second thickness 880 (e.g., from the first thickness 870 to the second thickness 880 when moving towards the aft end 174). In this example, the first region 803 and the second region 805 have a higher value for the stiffness factor than a remainder of the thrust link span 178.

Similar to the previous example geometric orientations, the values of the uniform inner diameter 865, the first thickness 870, and the second thickness 880 are variable depending on the modal response targeted based on the resonant vibration frequencies generated by the aircraft engine 100. For example, a position and/or span of the first thickness 870 relative to the thrust link span 178 can be adjusted to obtain a mass that provides the target modal response. Further, relative dimensions of (e.g., a relationship between) the uniform inner diameter 865, the first thickness 870, and the second thickness 880 can be adjusted based on a desired response frequency. In some examples, the uniform inner diameter 865 ranges from 1 inch (2.54 cm) to 5 inches (12.7 cm). In some examples, the first thickness 870 defines an outer diameter ranging from 3 inches (7.62 cm) to 6 inches (15.24 cm). In some examples, the second thickness 880 defines an outer diameter ranging from 2.75 inches (6.99 cm) to 5.5 inches (13.97 cm). In some examples, the fourth thrust link geometric orientation 860 implements means for withstanding the resonant vibration frequency generated by the aircraft engine 100.

The thrust link geometric orientations 700, 800, 840, 860 of FIGS. 7-8 provide nodal stiffeners on the inside and/or outside of the thrust link 170 to enable an overall (e.g., average, mode) diameter of the thrust link 170 to be reduced. As a result, the thrust link geometric orientations 700, 800, 840, 860 of FIGS. 7-8 provide more space in the under-cowl compartment for other engine hardware and/or reduce a weight of the aircraft engine 100.

Thrust Link with a Damper

Figure 9:
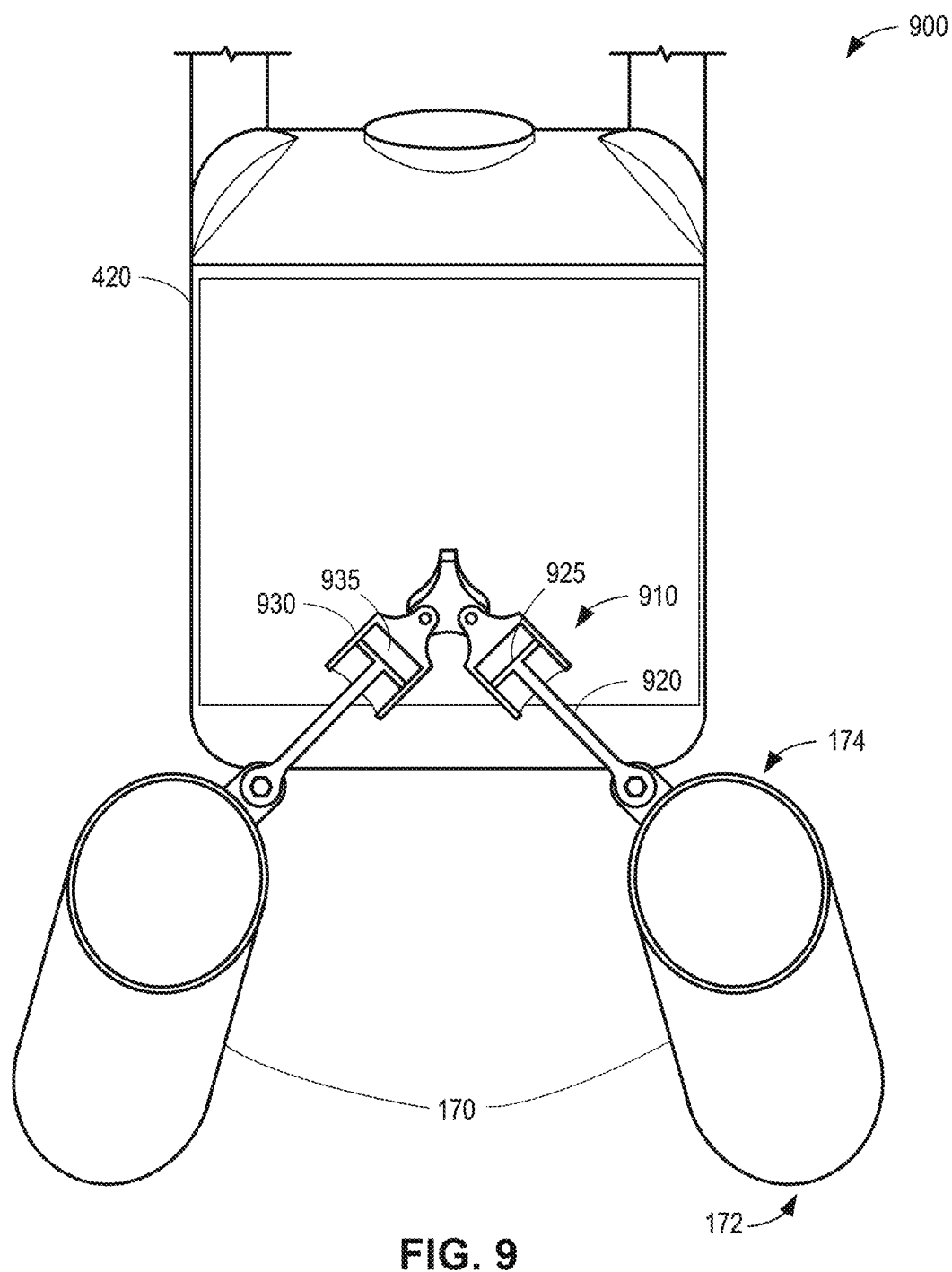
FIG. 9 is a first example vibration damping arrangement of the thrust link of any of FIGS. 1A-1B and/or 4-8.

FIG. 9 is a view of the thrust link 170 looking axially forward (e.g., along the positive R-axis, from the aft end 174 towards the forward end 172). The example of FIG. 9 shows an example thrust link system 900. The thrust link system 900 includes the thrust link 170 coupled to the surrounding engine hardware 420 via a damper 910 (e.g., a viscous damper). In the example of FIG. 9, the thrust link 170 is coupled to the surrounding engine hardware 420 via the damper 910 at the aft end 174 of the thrust link 170.

The damper 910 of the example of FIG. 9 includes a piston rod 920 and a chamber 930 (e.g., a viscous chamber). The piston rod 920 is coupled to the thrust link 170 at the aft end 174 and the chamber 930 is coupled to the surrounding engine hardware 420. The piston rod 920 includes a piston head 925 that operates within the chamber 930 (e.g., moving inward and outward of the chamber 930). The chamber 930 includes a fluid region 935 where a fluid (e.g., a viscous fluid) interacts with the piston head 925 to create a damping response to the resonant vibration frequencies generated by the aircraft engine 100. In some examples, the fluid region 935 includes a fluid, such as oil or silicone fluid. The type of fluid used can vary to achieve a modal response within the targeted range. For example, the damper 910 can correspond to a dashpot (e.g., a damper), which is a mechanical device that resists motion via viscous friction. A resulting resistance force is proportional to the velocity but acts in a direction opposite that of the velocity to reduce the velocity and, thus, absorb energy associated with the movement. The damping ratio implemented by the damper 910 to produce the target modal response ranges from 0.5 to 2.0. In some examples, the damping ratio implemented by the damper 910 to produce the target modal response ranges from 0.7 to 2.0. In some examples, the damping ratio implemented by the damper 910 to produce the target modal response ranges from 1.0 to 2.0. Targeting a damping ratio that is near critically damped or overdamped ensures that the response of the thrust link 170 is less than an input stimulus from an engine vibration. In some examples, when the damping ratio provided by the damper 910 is 0.7, the damped response of the thrust link 170 is underdamped, which allows for a response to an excitation input that is between one-third and one-half of the input. In some examples, when the damping ratio provided by the damper 910 is 2.0, the damped response of the thrust link 170 is overdamped, which allows for a response to the excitation input to be approximately 6.9% of the input. Accordingly, the damper 910 enables reduced deflection of the thrust link 170 when the damping ratio provided by the damper 910 is 2.0 compared to when the damping ratio provided by the damper 910 is 0.7. Further, enabling the damping ratio to be provided by the damper 910 as part of a system response associated with the thrust link 170 enables a design of the thrust link to be focused more towards meeting mechanical loading from thrust as opposed to sixing for modal responses outside of the operating range. As a result, the thrust link 170 can have a smaller diameter, which increases under-cowl space for surrounding engine hardware and/or reduces a weight of the aircraft engine 100, while meeting both modal response requirements and thrust/buckling requirements.

In some examples, the thrust link system 900 implements means for withstanding the resonant vibration frequency generated by the aircraft engine 100.

Figure 10:
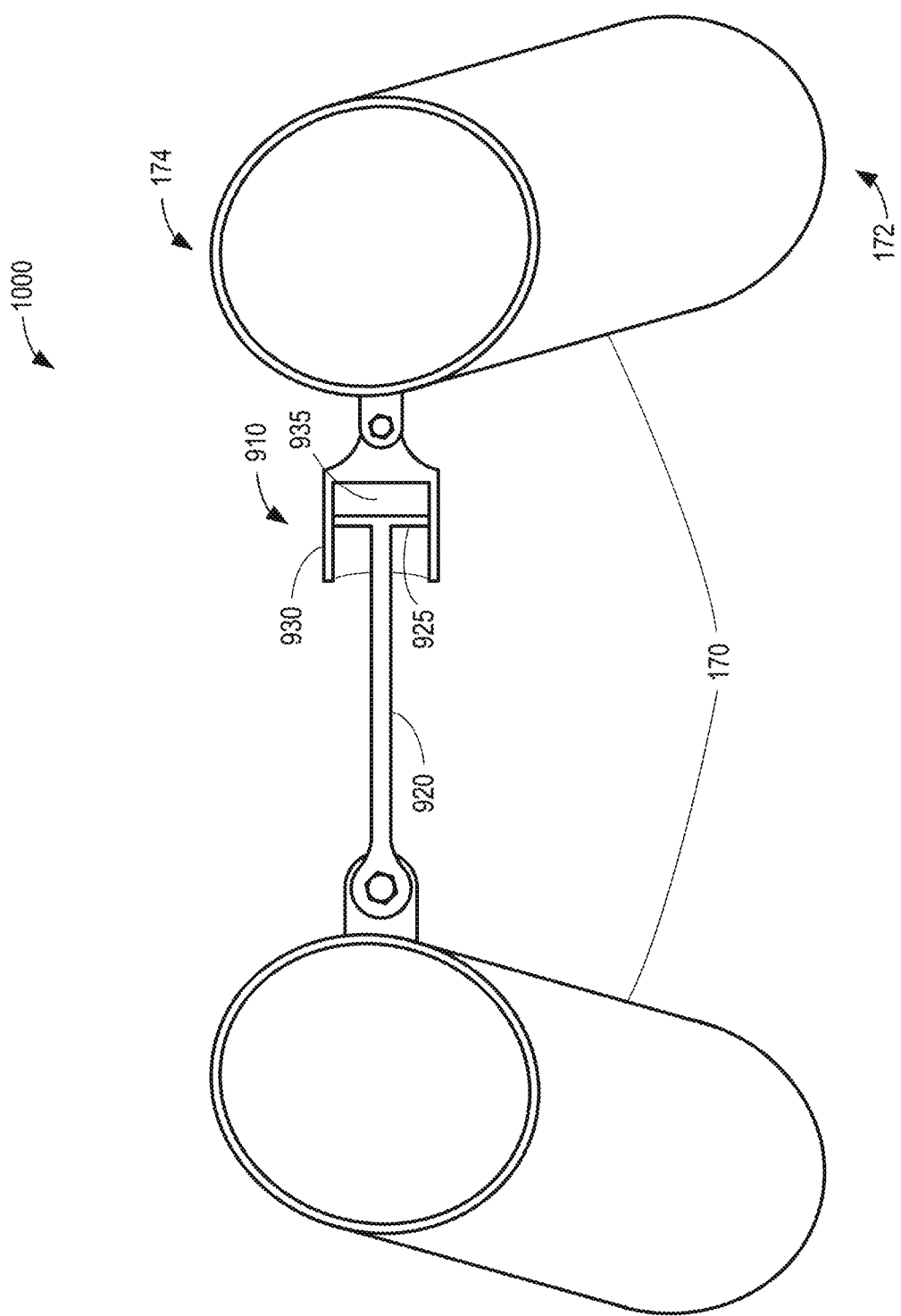
FIG. 10 is a second example vibration damping arrangement of the thrust link of any of FIGS. 1A-1B and/or 4-8.

FIG. 10 is a view the thrust link 170 looking axially forward (e.g., along the positive R-axis, from the aft end 174 towards the forward end 172). The example of FIG. 10 shows another example thrust link system 1000. The thrust link system 1000 includes two thrust links 170 coupled together via the damper 910. In the example of FIG. 10, the thrust links 170 are coupled to the aircraft engine 100 (FIG. 1A), the pylon 180 (FIG. 1B), or an associated aircraft via the elements disclosed in FIGS. 1A, 1B, 3 and/or 4.

The damper 910 of FIG. 10 includes the piston rod 920 and the chamber 930, the piston head 925 of the piston rod 920 operating within the chamber 930. Similar to FIG. 9, the chamber includes the fluid region 935 where a fluid interacts with the piston head 925 to create the damping response.

As shown in FIG. 10, the piston rod is coupled to one of the thrust links 170 at the aft end 174 and the chamber 930 is coupled to the other thrust link 170 also at the aft end 174. Such an arrangement can be desirable where a thrust link footprint (e.g., space available for the thrust links 170) is limited such that neither of the thrust links 170 can be coupled to the surrounding engine hardware 420 outside of the forward end 172 (e.g., the forward attachment point) and the aft end 174 (e.g., the aft attachment point). While the example of FIG. 10 shows only one damper 910 coupled to the thrust links 170, more than one damper 910 can be used herein.

In some examples, the thrust link system 1000 implements means for withstanding the resonant vibration frequency generated by the aircraft engine 100.

Figure 11:
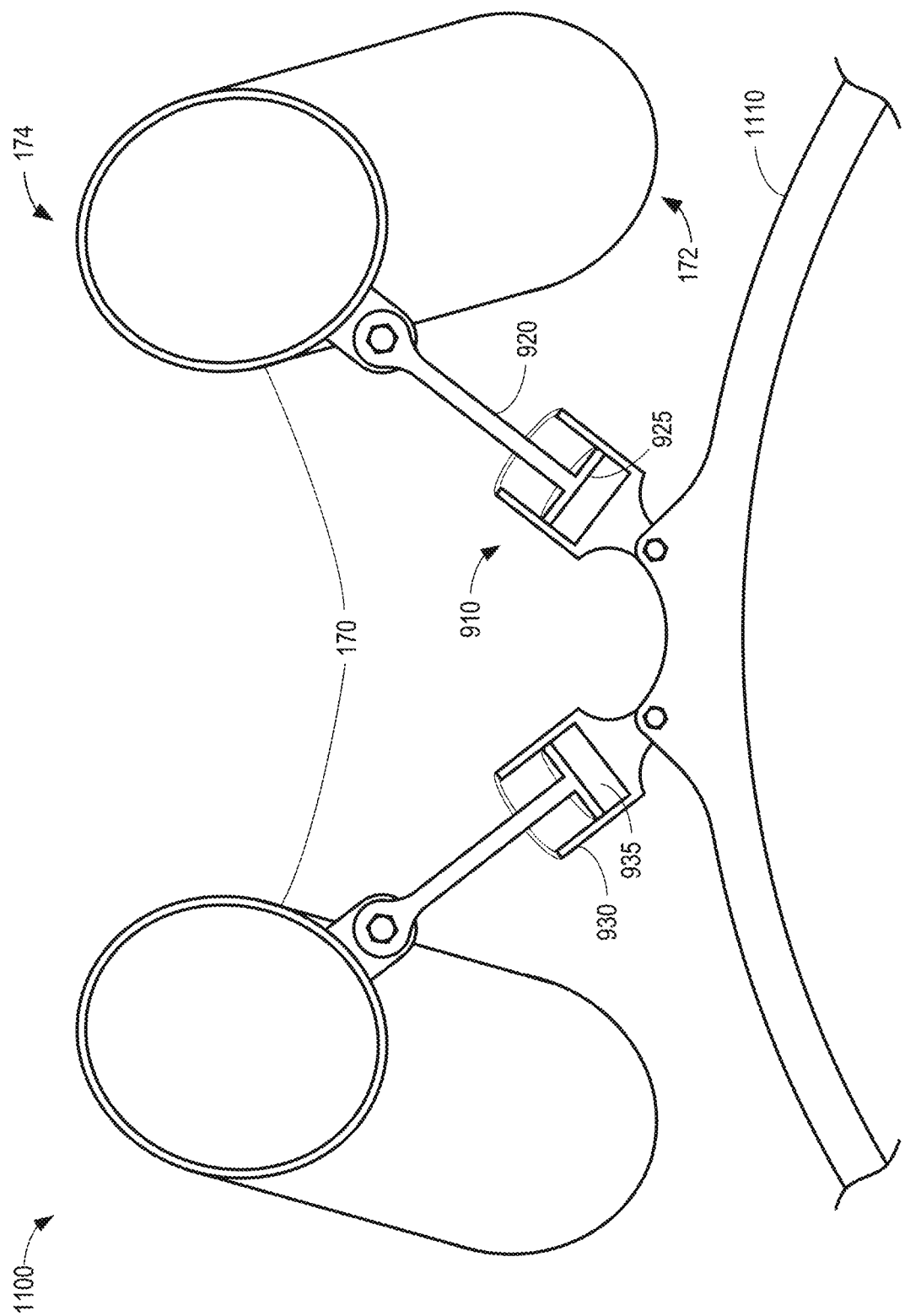
FIG. 11 is a third example vibration damping arrangement of the thrust link of any of FIGS. 1A-1B and/or 4-8.

FIG. 11 is a view the thrust link 170 looking axially forward (e.g., along the positive R-axis, from the aft end 174 towards the forward end 172). The example of FIG. 11 shows another example thrust link system 1100. In the example of FIG. 11, the thrust link 170 is coupled to an engine carcass 1110 via the damper 910. In examples disclosed herein, the engine carcass 1110 can be the outer casing 108 or any other portion of the aircraft engine 100 that can support structural and/or thrust loads.

The damper 910 of FIG. 11 includes the piston rod 920 and the chamber 930, the piston head 925 of the piston rod 920 operating within the chamber 930. Similar to FIGS. 9 and 10, the chamber 930 includes the fluid region 935 where a fluid interacts with the piston head 925 to create the damping response. The piston rod 920 is coupled to the thrust link 170 at the aft end 174 and the chamber 930 is coupled to the engine carcass 1110.

In the example of FIG. 11, coupling the thrust link 170 to the engine carcass 1110 can accomplish the same goal as the thrust link system 1000, in which the footprint of the thrust link 170 is smaller. In other examples, the thrust link system 1100 implements an alternative to the thrust link system 900 of FIG. 9 where it may not be feasible to couple the thrust link 170 to the surrounding engine hardware 420.

In some examples, the thrust link system 1100 implements means for withstanding the resonant vibration frequency generated by the aircraft engine 100.

Figure 12:
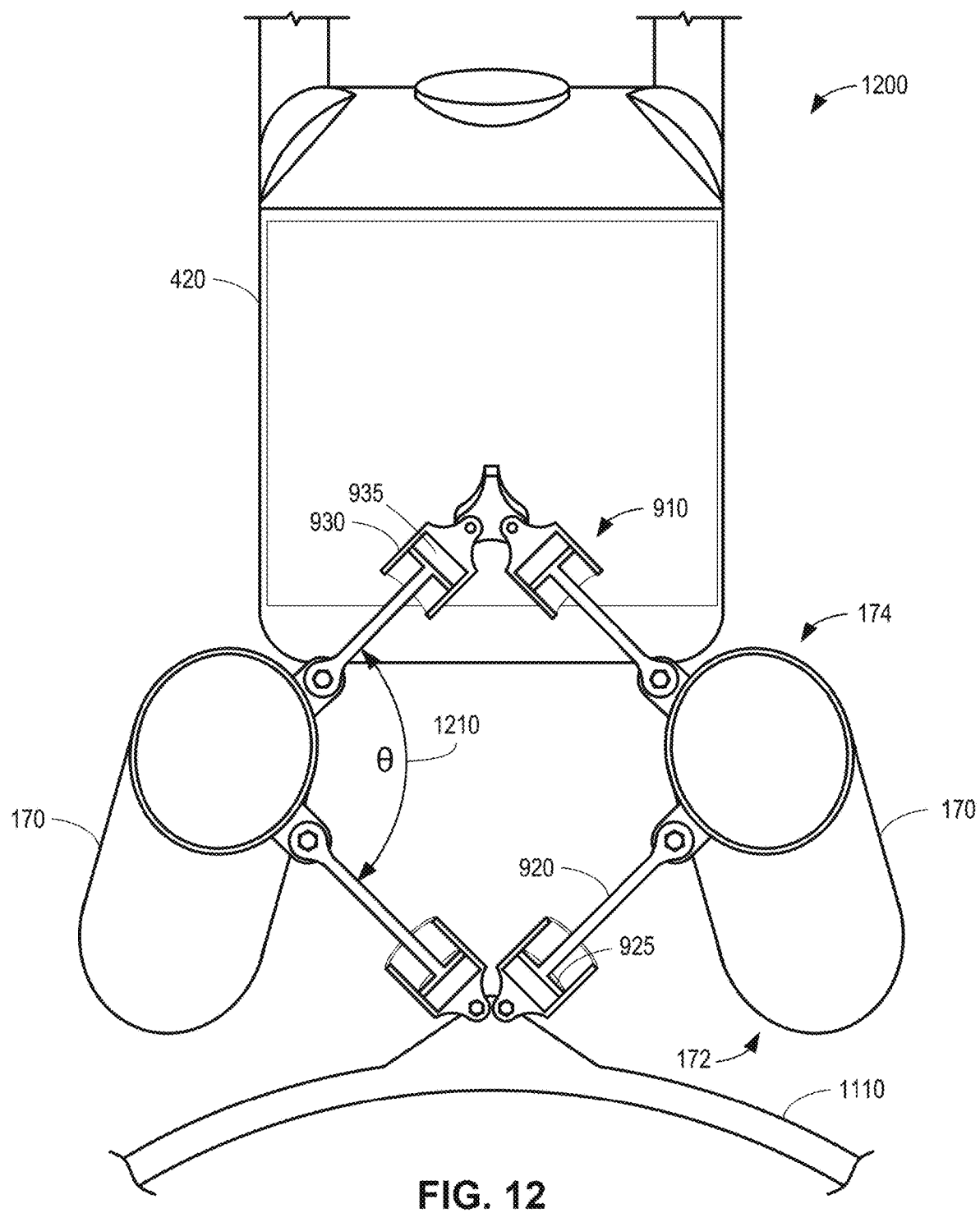
FIG. 12 is a fourth example vibration damping arrangement of the thrust link of any of FIGS. 1A-1B and/or 4-8.

FIG. 12 is a view the thrust link 170 looking axially forward (e.g., along the positive R-axis, from the aft end 174 towards the forward end 172). FIG. 12 shows another example thrust link system 1200 that includes a combination of the thrust link system 900 of FIG. 9 and the thrust link system 1100 of FIG. 11, such that each thrust link 170 is coupled to the surrounding engine hardware 420 via a first damper (e.g., the damper 910) and is also coupled to the engine carcass 1110 via a second damper (e.g., the damper 910). Thus, each thrust link 170 is coupled to two dampers 910. Such an orientation can be beneficial to allow more freedom or flexibility in targeting the modal responses to create an effective damping response to aircraft engine 100 vibration. As such, modal responses can be targeted using the dampers 910, changing the orientation of the dampers 910, and/or changing the fluid within the chambers 930.

Each damper 910 of FIG. 12 includes the piston rod 920 and the chamber 930, the piston head 925 of the piston rod 920 operating within the chamber 930. Similar to FIGS. 9-11, the chamber 930 includes the fluid region 935 in which a fluid interacts with the piston head 925 to create the damping response. Each piston rod 920 is coupled to the thrust link 170 at the aft end 174, and one chamber 930 is coupled to the engine carcass 1110 while another chamber 930 is coupled to the surrounding engine hardware 420.

In the example of FIG. 12, each damper 910 coupled to the thrust link 170 is oriented at a damper separation angle θ 1210. In examples disclosed herein, the damper separation angle θ 1210 is substantially perpendicular. As used herein in the context of describing the position and/or orientation of a first object relative to a second object, the term "substantially perpendicular" encompasses the term perpendicular and more broadly encompasses a meaning whereby the first object is positioned and/or oriented relative to the second object at an absolute angle of no more than five degrees (5°) from perpendicular. As such, a first one of the damper 910 that is substantially perpendicular to a second one of the damper is positioned and/or oriented relative to the second one of the damper at an absolute angle of no more than five degrees (5°) from perpendicular. However, other damper separation angles θ 1210 may be used to impact the target modal response.

In some examples, the thrust link system 1200 implements means for withstanding the resonant vibration frequency generated by the aircraft engine 100.

Figure 13A:
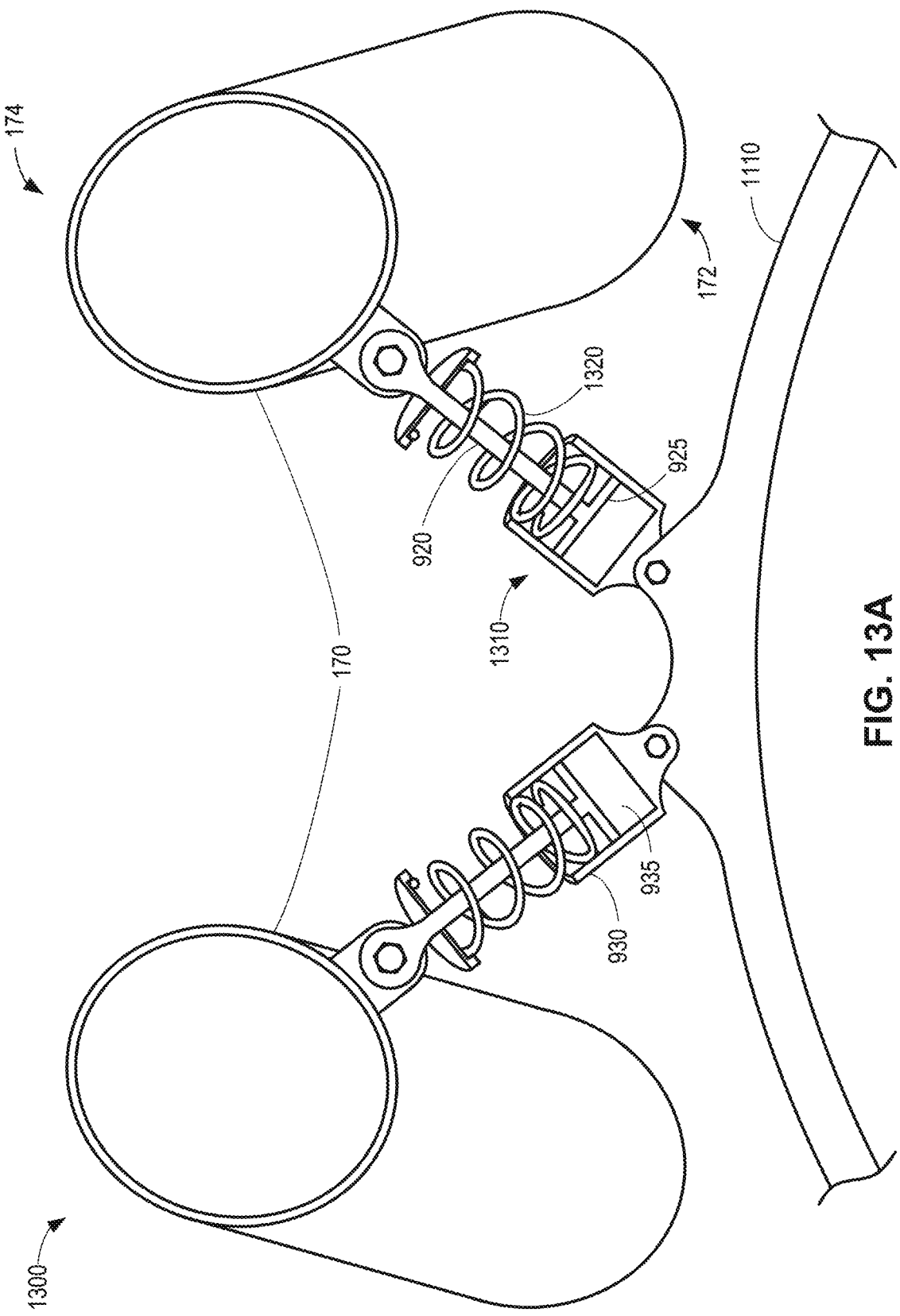
FIG. 13A is a fifth example vibration damping arrangement of the thrust link of any of FIGS. 1A-1B and/or 4-8.

FIG. 13A is a view the thrust link 170 looking axially forward (e.g., along the positive R-axis, from the aft end 174 towards the forward end 172). The example of FIG. 13A shows another example thrust link system 1300 that includes a damper 1310. The damper 1310 of FIG. 13A includes the piston rod 920 and the chamber 930, the piston head 925 of the piston rod 920 operating within the chamber 930. Similar to FIGS. 9-12, the chamber 930 includes the fluid region 935 where a fluid interacts with the piston head 925 to create the damping response. The damper 1310 also includes a spring 1320 that surrounds the piston rod 920. The spring 1320 imposes an additional damping response based on a spring constant imparted by the spring 1320.

In the example of FIG. 13A, the damper 1310 is coupled to the thrust link 170 in an orientation similar to that of the thrust link system 1100 of FIG. 11. However, any of the examples of FIGS. 9-12 could include the damper 1310 of FIG. 13A as a replacement to the damper 910 of FIGS. 9-12.

In some examples, the spring constant of the spring 1320 is based on a material of the spring and/or the geometric properties of the spring (e.g., the length of coil of the spring 1320, a thickness of the coils of the spring 1320, a diameter of the spring 1320, a material of the spring 1320, a number of turns in the coil of the spring 1320, etc.). In examples disclosed herein, the spring constant of the spring 1320 has a range of 0 pounds-per-inch to 20,000 pounds-per-inch. In examples disclosed herein, the spring constant of the spring 1320 has a range of 0 pounds-per-inch to 10,000 pounds-per-inch. A higher spring constant of the spring 1320 enables the spring 1320 to provide more resistance to deflection. The exact spring constant is determined based on the target modal response to the resonant vibration frequency generated by the aircraft engine 100, and may be modified as with the properties of the fluid in the fluid region 935 and/or the geometry of the damper 1310 to impact the target modal response.

In some examples, the thrust link system 1300 implements means for withstanding the resonant vibration frequency generated by the aircraft engine 100.

Figure 13B:
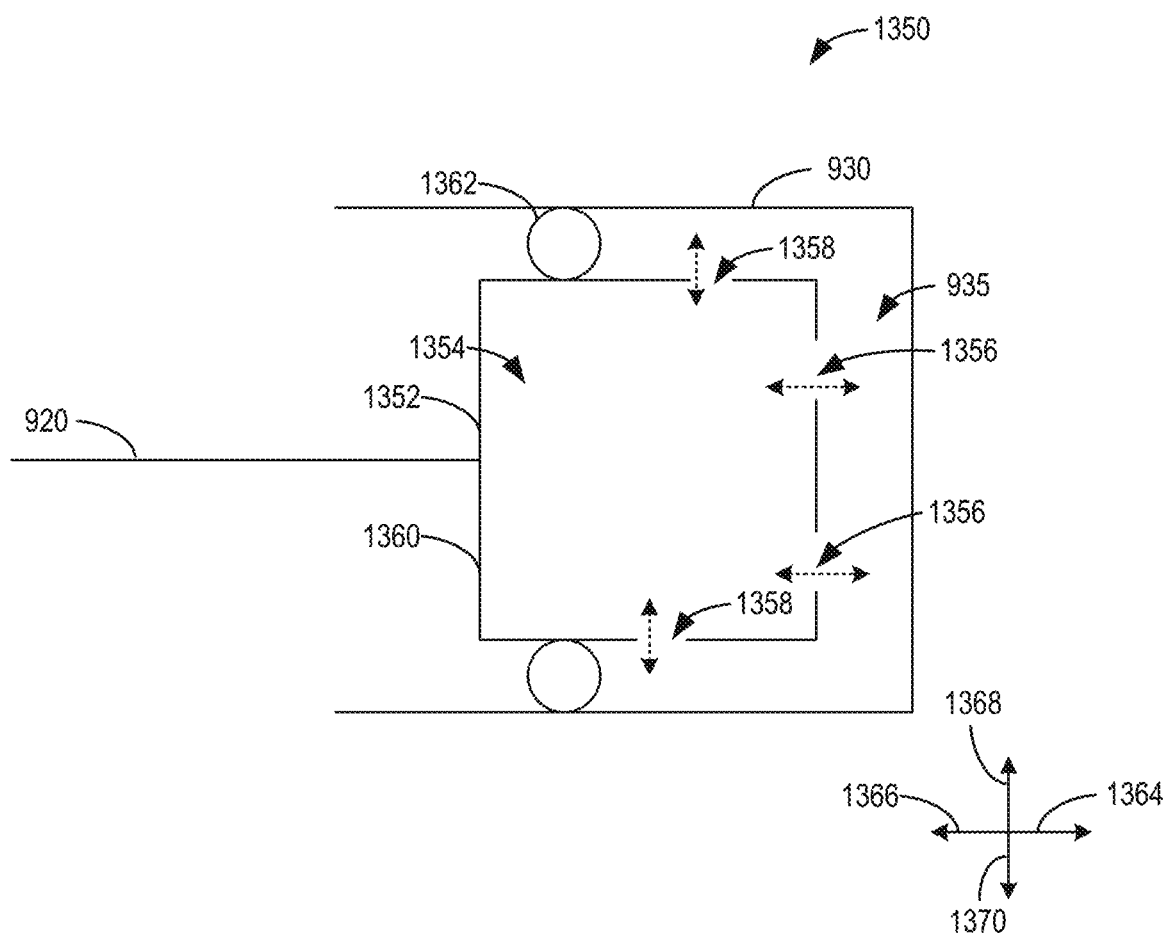
FIG. 13B is an example multi-direction damper that can be utilized in the vibration damping arrangement of FIGS. 9, 10, 11, 12, and/or 13A.

FIG. 13B illustrates an example multi-direction damper 1350 that can be utilized in the thrust link systems 900, 1000, 1100, 1200, 1300 of FIGS. 9, 10, 11, 12, and/or 13A. The multi-direction damper 1350 of FIG. 13B includes the piston rod 920 and a piston 1352 that operates (e.g., is movable in) the fluid region 935 of the chamber 930. In the illustrated example of FIG. 13B, the piston 1352 includes a piston chamber 1354 in which the fluid from the fluid region 935 is flowable. Specifically, the piston 1352 includes one or more first orifices 1356 (e.g., axial orifices) and one or more second orifices 1358 (e.g., radial orifices) that enable the fluid to flow in and out of the piston chamber 1354 as the piston 1352 moves in the fluid region 935. A volume of air is positioned in the fluid region 935 and/or the piston chamber 1354 to enable the viscous damping fluid to move freely in and out of the piston chamber 1354 as the piston 1352 moves. As such, the multi-direction damper 1350 behaves like a dashpot style damper. A portion 1360 of the piston 1352 that directly connects to the piston rod 920 is sealed (e.g., does not include orifices) to prevent the fluid from escaping therethrough. The multi-direction damper 1350 also includes a seal 1362 coupled to the piston 1352 to block the fluid from exiting the fluid region 935.

In the illustrated example of FIG. 13B, the first orifices 1356 and the second orifices 1358 increase viscous friction encountered by the fluid as the piston 1352 moves in the chamber 930, which results in an increased energy dissipation rate. For example, during operation, when the piston 1352 moves in a first direction 1364 further into the chamber 930, the viscous damping fluid flows through the first orifices 1356 into the piston chamber 1354. As a result, the fluid resists the movement of the piston 1352 and encounters viscous friction that produces heat energy, which is the form in which the kinetic energy associated with the movement of the piston 1352 is dissipated. When the piston 1352 moves in a second direction 1366 opposite the first direction 1364 further out of the chamber 930, the viscous damping fluid flows through the first orifices 1356 out of the piston chamber 1354 to refill the fluid region 935 of the chamber 930. When the piston 1352 moves in a third direction 1368 or a fourth direction 1370, the viscous damping fluid flows through the second orifices 1358 into the piston chamber 1354 on one side and out of the piston chamber 1354 on the other and/or through the first orifices 1356 to similarly resist movement of the piston 1352 and generate viscous friction to dissipate energy associated with the movement. As a result, the multi-direction damper 1350 resists movement of the piston 1352 in more than one direction. Thus, the multi-direction damper 1350 can dampen movements of the aft end 174 of the thrust link 170 in more than one direction (e.g., in the axial direction (along the r-axis) and the radial direction (along the y-axis) in the thrust link systems 900, 1000, 1100, 1200, 1300 of FIGS. 9, 10, 11, 12, and/or 13A.

In some examples, the piston 1352 does not include the first orifices 1356 and/or the second orifices 1358. In such example, the viscous damping fluid is flowable against more than one side of the piston 1352 to still enable the fluid to resist movement of the piston 1352 in more than one direction.

Thrust Link with Fluid Damping

Figure 14A:
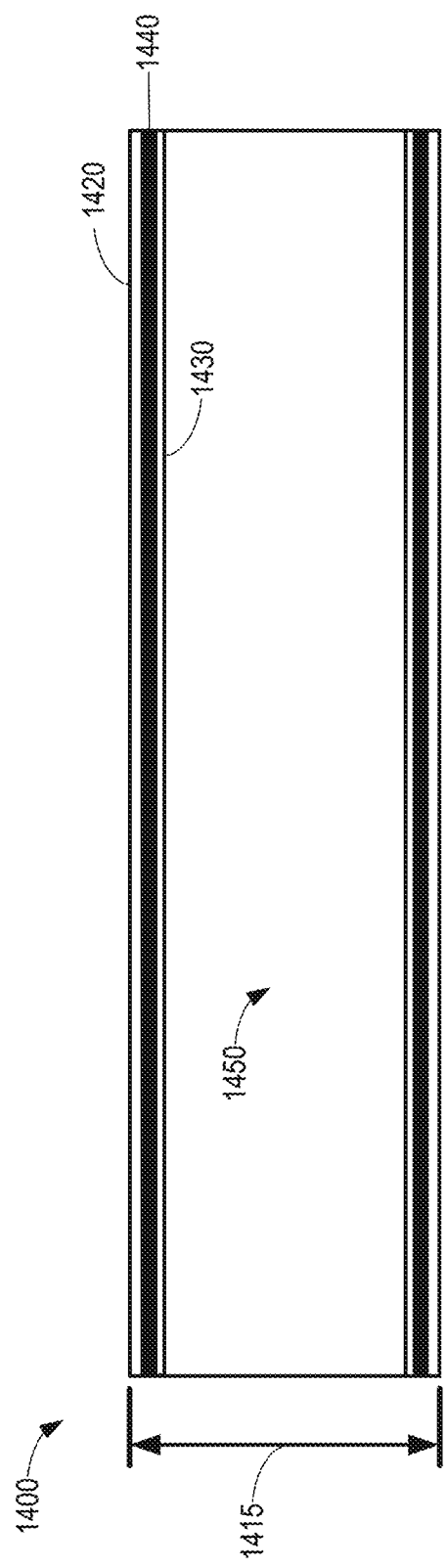
FIG. 14A is a cross-sectional view of an example implementation of the thrust link of any of FIGS. 1A-1B and/or 4A-13A including a first fluid filled thrust link system.
Figure 14B:
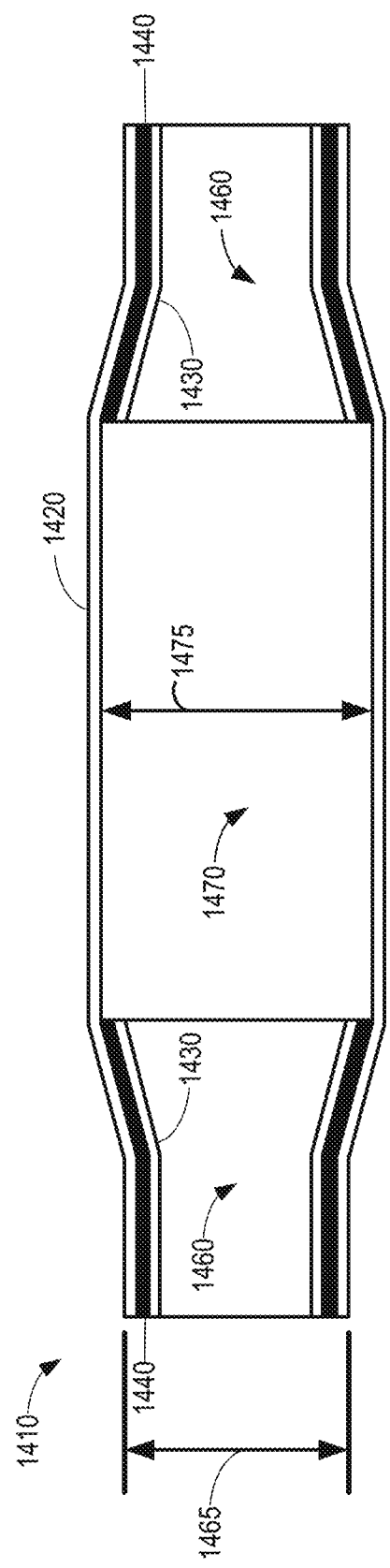
FIG. 14B is a cross-sectional view of an example implementation of the thrust link of any of FIGS. 1A-1B and/or 4A-13A including a second fluid filled thrust link system.
Figure 14C:
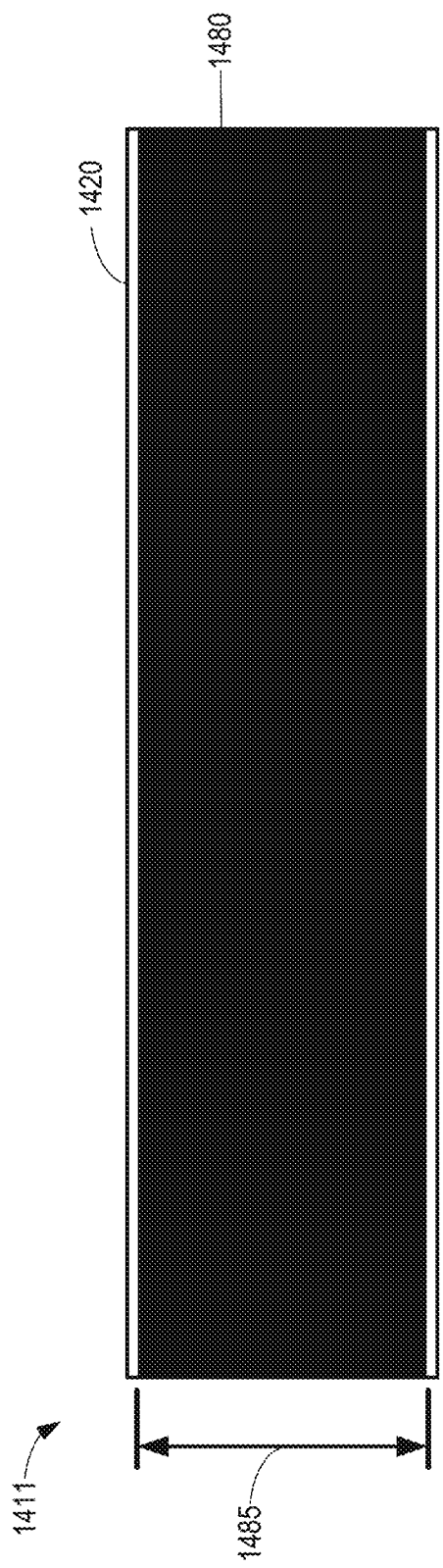
FIG. 14C is a cross-sectional view of a third example implementation of the thrust link of any of FIGS. 1A-1B and/or 4A-13A including a first fluid filled thrust link system.
Figure 14D:
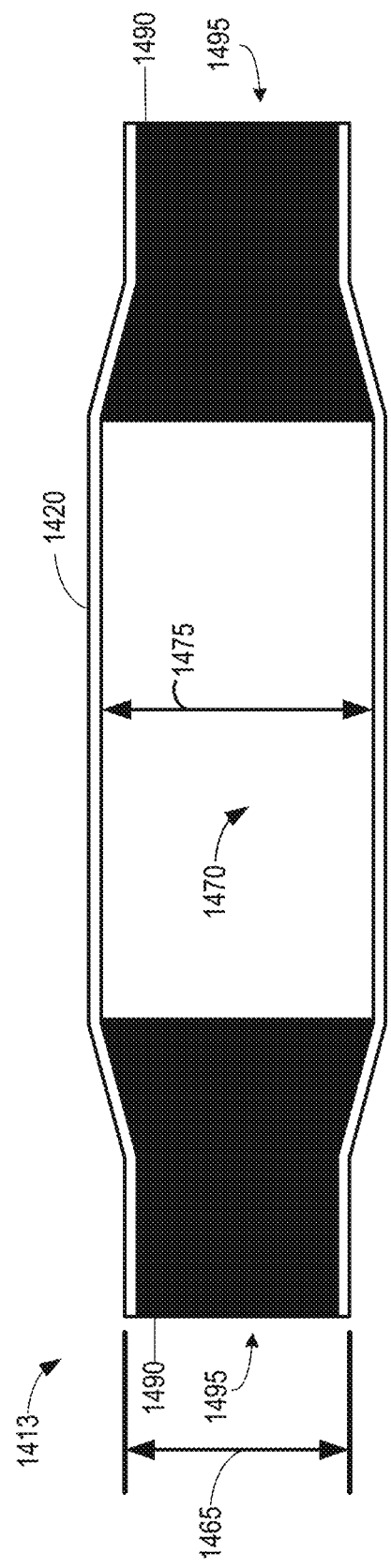
FIG. 14D is a cross-sectional view of an example implementation of the thrust link of any of FIGS. 1A-1B and/or 4A-13A including a fourth fluid filled thrust link system.

FIGS. 14A, 14B, 14C, and 14D show four cross-sectional views of the thrust link 170 of any of FIGS. 1A-C and/or 4-13A. FIG. 14A shows a first fluid filled thrust link system 1400, FIG. 14B shows a second fluid filled thrust link system 1410, FIG. 14C shows a third fluid filled thrust link system 1411, and FIG. 14D shows a fourth fluid filled thrust link system 1413.

The first fluid filled thrust link system 1400 of FIG. 14A includes an outer wall 1420 (e.g., a first wall), an inner wall 1430 (e.g., a second wall), a fluid channel 1440, and an inner area 1450. The first fluid filled thrust link system 1400 has a uniform outer diameter 1415 across the entire length of the thrust link 170.

The fluid channel 1440 is formed between the outer wall 1420 and the inner wall 1430. In some examples, the fluid channel 1440 includes a thickness (e.g., a diameter or distance between the inner wall 1430 and the outer wall 1420) of approximately 0.25 inches. The fluid channel 1440 holds a fluid which can be pressurized to obtain the target modal response. Examples of such fluids include engine oil, non-corrosive fluids, nitrogen, inert gasses such as argon, etc. In the examples disclosed herein, the fluid is pressurized to a range between 50 pounds-pre-square-inch gauge (e.g., relative to atmospheric pressure) and 500 pounds-per-square-inch gauge. Using a fluid within the thrust link 170 creates an additional variable to reach the target modal response to the resonant vibration frequencies produced by the aircraft engine 100. The pressure and/or mass of the fluid in the fluid channel 1440 provides a localized damping benefit in addition to adding mass to the system. As such, the pressure and/or the mass of the fluid in the fluid channel 1440 can be adjusted to control the modal response.

The inner area 1450 is defined as the area inside of the inner wall 1430. In some examples, the inner area 1450 may be solid (e.g., non-hollow) while in other examples, the inner area 1450 may be hollow. In some examples, the inner wall 1430 defines an inner diameter between 0 inches (e.g., when the inner area is solid) and 5.5 inches. In some examples, the outer wall 1420 defines an outer diameter between 3.0 inches and 6.0 inches. The material used in the thrust link 170 (e.g., the metal used to form the thrust link 170) may be used in combination with the representation of the inner area (e.g., solid, hollow, or somewhere in between) and the pressure of the fluid used in the fluid channel 1440 to define the target modal response.

In some examples, the first fluid filled thrust link system 1400 implements means for withstanding the resonant vibration frequency generated by the aircraft engine 100.

The second fluid filled thrust link system 1410 of FIG. 14B includes the outer wall 1420, the inner wall 1430, the fluid channel 1440, a first interior area 1460, and a second interior area 1470. The second fluid filled thrust link system 1410 does not include a uniform thrust link 170 diameter across the length of the thrust link (e.g., the span 178). The second fluid filled thrust link system 1410 includes a first diameter 1465 at the first interior area 1460 and a second diameter 1475 at the second interior area 1470. The first diameter 1465 is tapered into the second diameter 1475 between the first interior area 1460 and the second interior area 1470, similar to the tapering of the first thrust link geometric orientation 700 of FIG. 7. In some examples, the first diameter 1465 is approximately 3.0 inches, and the second diameter is approximately 5.5 inches. In some examples, a length of a taper from the first diameter 1465 to the second diameter 1475 extends (i) from 10% of the span 178 (FIGS. 1A-1B, 4-5, and 7-8) from the forward end 172 to 40% of the span 178 from the forward end 172 and (ii) from 10% of the span 178 from the aft end 174 to 40% of the span 178 from the aft end 174.

In the second fluid filled thrust link system 1410 of FIG. 14B, the inner wall 1430 extends from the ends of the thrust link 170 (e.g., the forward end 172 and the aft end 174) to the second interior area 1470. As such, the fluid channel 1440 surrounds the first interior area 1460 and does not extend into the second interior area 1470.

Like that of the first fluid filled thrust link system 1400, the fluid channel 1440 of the second fluid filled thrust link system 1410 houses a fluid which can be pressurized to a range between 50 pounds-per-square-inch gauge and 500 pounds-per-square-inch gauge. The first interior area 1460 and/or the second interior area 1470 may be solid, hollow, or somewhere in between. Such properties (e.g., the type of fill used for the first interior area 1460 and the second interior area 1470) can be defined based on the target modal response and a mass associated with obtaining the target modal response. In some examples, the fluid channel 1440 extends (i) 25% of the span 178 from the forward end 172 and (ii) 25% of the span 178 from the aft end 174. The fluid in the thrust link systems 1400, 1410, 1411, 1413 serves as a damping mechanism that modifies the vibratory response of the thrust link 170. Additionally, fluid weight can be selectively distributed across the thrust link span 178 to change the resonance frequencies. In some examples, the damping ratio implemented by the fluid to produce the target modal response ranges from 0.5 to 2.0. In some examples, the damping ratio implemented by the fluid to produce the target modal response ranges from 0.7 to 2.0. In some examples, the damping ratio implemented by the fluid to produce the target modal response ranges from 1.0 to 2.0.

In some examples, the second fluid filled thrust link system 1410 implements means for withstanding the resonant vibration frequency generated by the aircraft engine 100.

The third fluid filled thrust link system 1411 of FIG. 14C includes the outer wall 1420 and a fluid channel 1480 occupying a space defined by an inner diameter 1485 of the outer wall 1420. In some examples, the fluid channel 1480 includes a diameter between 3.0 and 5.5 inches. That is, the third fluid filled thrust link system 1411 is similar to that of FIG. 14A but does not include the inner wall 1430 (FIG. 14A) and the fluid occupies the inner area 1450 (FIG. 14A). In some examples, the third fluid filled thrust link system 1411 implements means for withstanding the resonant vibration frequency generated by the aircraft engine 100.

The fourth fluid filled thrust link system 1413 of FIG. 14D includes the outer wall 1420, the first diameter 1465, the second interior area 1470, the second diameter 1475, and a fluid channel 1490 occupying a first interior area 1495. In this example, the first interior area 1495 includes the fluid channel 1440 (FIG. 14B) plus the first interior area 1460 (FIG. 14B). That is, the fourth fluid filled thrust link system 1413 is similar to that of FIG. 14B but does not include the inner wall 1430. In some examples, the fourth fluid filled thrust link system 1413 implements means for withstanding the resonant vibration frequency generated by the aircraft engine 100.

In operation, the aircraft engine 100 intakes air through the fan section 106, passing the air into the LP turbine 120 and then into the HP turbine 118. Each of the fan section 106, the LP turbine 120 and the HP turbine 118 produce a vibration for which a resonant vibration frequency can be measured, either in combination or individually. In examples disclosed herein, the operation of the aircraft engine 100 also produces forces and moments. These forces and moments can cause structural damage to the aircraft engine 100 and any connection points which attach the aircraft engine 100 to an external platform (e.g., an aircraft) if not accounted for.

The example thrust link systems 400, 500, 600, 900, 1000, 1100, 1200, 1300, 1400, 1410, 1411, 1413 and/or the thrust link geometric orientations 700, 800, 840, 860 disclosed herein transfer thrust forces generated by the aircraft engine 100 to the aircraft. Combining the vibration damping devices with the thrust link 170 allows for distributing forces and moments while also dissipating resonant vibration frequencies generated by the aircraft engine 100. Alone or in combination, the thrust link systems 400, 500, 600, 900, 1000, 1100, 1200, 1300, 1400, 1410, 1411, 1413 and/or the thrust link geometric orientations 700, 800, 840, 860 provide a means for transferring thrust loads and a means for withstanding a resonant vibration frequency produced by a means for generating thrust, such as the aircraft engine 100. In operation, the means for damping vibration serves to protect the means for generating thrust and provide a mechanism by which to dissipate generated vibration and avoid damage, wear, and/or other negative effect during operation of the means for generating thrust, for example.

From the foregoing, it will be appreciated that example systems, apparatus, articles of manufacture, and methods have been disclosed that control a response to a resonant vibration frequency. Example systems, apparatus, articles of manufacture, and methods have been disclosed to target vibration frequency modal responses outside of an operating range of a vibration-producing device allowing control of the response to the resonant vibration frequency across the entire operating range of the vibration-producing device.

The foregoing examples of engine supporting systems, including thrust links and dampers and/or bumpers that couple to the thrust links, can be used with aircraft engines. Although each example engine supporting system disclosed above has certain features, it should be understood that it is not necessary for a particular feature of one example engine supporting system to be used exclusively with that example. Instead, any of the features described above and/or depicted in the drawings can be combined with any of the examples, in addition to or in substitution for any of the other features of those examples. Features of one example are not mutually exclusive to other features of another example. Instead, the scope of this disclosure encompasses any combination of any of the features.

Further aspects are provided by the subject matter of the following clauses:

A thrust link for an aircraft engine, the thrust link comprising a forward end coupled to the aircraft engine, the forward end having a first diameter, and an aft end coupled to the aircraft engine or a pylon, the aft end having the first diameter, wherein the thrust link defines a thrust link span that extends from the forward end to the aft end, wherein a second diameter greater than the first diameter is defined between the forward end and the aft end, wherein the second diameter spans a center diameter span that is equivalent to or between 60% and 90% of the thrust link span.

A thrust link for an aircraft engine, the thrust link comprising a forward end coupled to the aircraft engine, the forward end including a first diameter, an aft end coupled to at least one of the aircraft engine or a pylon, a thrust link span extending from the forward end to the aft end, the aft end including the first diameter, a first region between the forward end and the aft end, at least a portion of the first region defining a first transition between the first diameter and a second diameter greater than the first diameter, the first region defining a first region span that spans from approximately 10% of the thrust link span to approximately 40% of the thrust link span, and a second region between the forward end and the aft end, at least a portion of the second region defining a second transition between the first diameter and the second diameter, the second region defining a second region span that spans from approximately 60% of the thrust link span to approximately 90% of the thrust link span.

The thrust link of any preceding clause, wherein the thrust link includes a stiffness factor that is based on a wall thickness of the thrust link across the thrust link span and a material of the thrust link, wherein the first region and the second region of the thrust link have a higher value for the stiffness factor than a remainder of the thrust link span.

The thrust link of any preceding clause, wherein the thrust link includes a third region spanning from the first region to the second region, wherein the third region includes a greater stiffness than the first region and the second region.

The thrust link of any preceding clause, wherein the first diameter is an end outer diameter (EOD), wherein the second diameter is a center outer diameter (COD), and wherein a span of the center diameter span relative to the thrust link span defines a center diameter span percentage (CDS %), wherein $$EQ3 = \left(\frac{COD(\text{in.})}{EOD(\text{in.})}\right) - 0.00065876152832674 * (COD(\text{in.}) * CDS\ \%(\%))^2 +$$
$$0.53333333333333 * (COD(\text{in.}) * (CDS\ \%(\%) * 100)),$$

and wherein EQ3 is greater than or equal to 122.2495 and less than or equal to 128.9963.

The thrust link of any preceding clause, wherein the aft end of the thrust link is coupled to the aircraft engine or the pylon via a damper.

The thrust link of any preceding clause, wherein a first thrust link location corresponding to 0% of the thrust link span is defined at the forward end, and wherein a second thrust link location corresponding to 100% of the thrust link span is defined at the aft end, wherein the center diameter span percentage extends from a third thrust link location corresponding to approximately 20% of the thrust link span to a fourth thrust link location corresponding to approximately 80% of the thrust link span.

The thrust link of any preceding clause, wherein the thrust link includes a third region spanning from the first region to the second region, wherein the third region includes an approximately constant diameter, wherein the approximately constant diameter is the first diameter, the second diameter, or a third diameter.

The thrust link of any preceding clause, wherein the aft end of the thrust link is coupled to the aircraft engine or the pylon via a damper.

The thrust link of any preceding clause, wherein the center diameter span has a range of 10 inches to 30 inches.

The thrust link of any preceding clause, wherein the first region includes a first taper that extends from the first diameter at 10% of the thrust link span to the second diameter at 40% of the thrust link span, and wherein the second region includes a second taper that extends from the second diameter at 60% of the thrust link span to the first diameter at 90% of the thrust link span.

The thrust link of any preceding clause, wherein the first diameter is a first outer diameter that defines a first thickness extending (i) from the forward end of the thrust link to a portion of the first region and (ii) from a portion of the second region to the aft end of the thrust link, and wherein the second diameter is a second outer diameter that defines a second thickness positioned in the first region and in the second region.

The thrust link of any preceding clause, wherein the thrust link includes a third region spanning from the first region to the second region, the third region including the first outer diameter.

The thrust link of any preceding clause, wherein the first diameter has a range of 2 inches to 7 inches.

The thrust link of any preceding clause, wherein the second diameter has a range of 3.5 inches to 6 inches.

The thrust link of any preceding clause, wherein the second diameter spans a second diameter span that has a range of 10 inches to 30 inches.

The thrust link of any preceding clause, further including a damping insert spanning a damping insert span that is less than the thrust link span.

The thrust link of any preceding clause, wherein the damping insert extends from the aft end of the thrust link.

The thrust link of any preceding clause, wherein a ratio of the damping insert span to the thrust link span is equal to or between 0.25 and 0.5.

The thrust link of any preceding clause, the thrust link comprising a forward end coupled to the aircraft engine, an aft end coupled to at least one of the aircraft engine or a pylon, a thrust link span defined from the forward end to the aft end, and a damping insert to span a damping insert span that is less than the thrust link span, wherein the damping insert extends from the aft end.

The thrust link of any preceding clause, wherein the thrust link includes an outer surface, and wherein the damping insert is placed inside a perimeter defined by the outer surface of the thrust link, and wherein the outer surface is to surround the damping insert along at least a portion of the damping insert span.

The thrust link of any preceding clause, wherein the thrust link includes an outer surface, and wherein the damping insert is positioned around the outer surface along at least a portion of the damping insert span.

The thrust link of any preceding clause, wherein a ratio of the damping insert span to the span is between 0.25 and 0.5.

The thrust link of any preceding clause, wherein the damping insert includes foam.

The thrust link of any preceding clause, wherein the damping insert includes plastic.

The thrust link of any preceding clause, wherein the damping insert includes rubber.

The thrust link of any preceding clause, wherein the damping insert includes metal.

A thrust link of an aircraft engine, the thrust link comprising a forward end coupled to the aircraft engine, an aft end coupled to the aircraft engine or a pylon, a thrust link span defined from the forward end to the aft end, and a damping insert spanning a damping insert span that is less than the thrust link span, wherein the damping insert extends from the aft end of the thrust link.

A thrust link of an aircraft engine, the thrust link comprising a forward end coupled to the aircraft engine, an aft end coupled to at least one of the aircraft engine or a pylon, wherein a thrust link span of the thrust link extends from the forward end to the aft end, wherein the thrust link includes at least one of a first inner diameter or a first outer diameter defined along a first portion of the thrust link span, and wherein the thrust link includes at least one of a second inner diameter or a second outer diameter defined along a second portion of the thrust link span, and a damping insert to span a damping insert span that is less than the thrust link span, wherein a ratio of the damping insert span to the thrust link span is equal to or between 0.25 and 0.5.

The thrust link of any preceding clause, wherein the thrust link includes an outer surface, and wherein the damping insert is disposed inside a perimeter defined by the outer surface of the thrust link, and wherein the outer surface surrounds the damping insert along at least a portion of the damping insert span.

The thrust link of any preceding clause,

An apparatus to support an aircraft engine, the apparatus comprising a thrust link including a forward end coupled to the aircraft engine, and an aft end coupled to at least one of the aircraft engine or a pylon, and a bumper coupled to (i) the thrust link between the forward end and the aft end and (ii) to an annular fan casing, a nacelle, the pylon, or an aircraft associated with the aircraft engine, a bumper distance percentage defined between the aft end and a location on the thrust link at which the bumper couples to the thrust link, the location aft of the forward end.

The apparatus of any preceding clause, wherein the thrust link includes an outer diameter that has a range of 2 inches to 7 inches.

The apparatus of any preceding clause, wherein the thrust link defines a thrust link span that extends from the forward end to the aft end, wherein the bumper distance percentage has a range of 10% to 30% of the thrust link span.

The apparatus of any preceding clause, wherein the bumper distance percentage is based on a damping ratio.

The apparatus of any preceding clause, wherein the damping ratio is based on a target response to a resonant vibration frequency produced by the aircraft engine, an initial amplitude of the aircraft engine, an exponential function, a decay rate, the resonant vibration frequency, and a phase angle of a response to the initial amplitude.

The apparatus of any preceding clause, wherein the damping ratio has a range of 0.5 to 2.0.

The apparatus of any preceding clause, wherein the bumper distance percentage is based on a first operating range of a low-pressure turbine of the aircraft engine and a second operating range of a high-pressure turbine of the aircraft engine.

The apparatus of any preceding clause, wherein the thrust link defines a thrust link span that extends from the forward end to the aft end, 0% of the thrust link span defined at the forward end, 100% of the thrust link defined at the aft end, and wherein the location on the thrust link at which the bumper couples to the thrust link is between 60% and 90% of the thrust link span.

The apparatus of any preceding clause, wherein the aft end of the thrust link is coupled to the aircraft engine or the pylon via a damper.

An apparatus to support an aircraft engine, the apparatus comprising a thrust link including a forward end coupled to the aircraft engine, an aft end coupled to at least one of the aircraft engine or a pylon, a thrust link span extending from the forward end to the aft end, and a bumper coupled to (i) a portion of the thrust link between the forward end and the aft end and (ii) to an annular fan casing, a nacelle, or the pylon, and a damping insert positioned inside the thrust link, the damping insert to span a damping insert span that is less than the thrust link span, the thrust link to surround the damping insert along the damping insert span.

The apparatus of any preceding clause, wherein a ratio of the damping insert length to the thrust link span is between 0.25 and 0.5.

The apparatus of any preceding clause, wherein the thrust link includes a diameter that has a range of 2 inches to 7 inches.

The apparatus of any preceding clause, wherein a bumper distance percentage is defined between the aft end of the thrust link and the portion of the thrust link to which the bumper couples, the bumper distance percentage has a range of 10% to 30% of the thrust link span.

The apparatus of any preceding clause, wherein the damping insert is made of at least one of a foam, rubber, or metal.

The apparatus of any preceding clause, wherein the aft end of the thrust link is coupled to the aircraft engine or the pylon via a damper.

An apparatus to support an aircraft engine, the apparatus comprising a thrust link including a forward end coupled to the aircraft engine, and an aft end coupled to at least one of the aircraft engine or a pylon, a thrust link span extending from the forward end to the aft end, and a bumper coupled to (i) the thrust link between the forward end and the aft end and (ii) to an annular fan casing, a nacelle, or the pylon, a bumper distance percentage defined between the aft end and a location on the thrust link at which the bumper couples to the thrust link, wherein the bumper distance percentage is between 10% and 30% of the thrust link span.

The apparatus of any preceding clause, further including a damping insert positioned inside the thrust link, the damping insert to span a damping insert span that is less than the thrust link span, the thrust link to surround the damping insert along the damping insert span.

The apparatus of any preceding clause, wherein a ratio of the damping insert span to the thrust link span is between 0.25 and 0.5.

The apparatus of any preceding clause, wherein the thrust link includes a diameter that has a range of 2 inches to 7 inches.

The apparatus of any preceding clause, wherein the aft end of the thrust link is coupled to the aircraft engine or the pylon via a damper.

An apparatus to support an aircraft engine, the apparatus comprising a thrust link, the thrust link including a forward end and an aft end, the forward end of the thrust link coupled to the aircraft engine, and a damper including a piston rod coupled to the aft end of the thrust link, the piston rod including a piston, and a chamber including a fluid, the piston rod to move within the chamber.

The apparatus of any preceding clause, wherein the damper provides a damping ratio that ranges from 0.5 to 2.0.

The apparatus of any preceding clause, wherein the chamber is coupled to a casing of the aircraft engine, a nacelle, or a pylon.

The apparatus of any preceding clause, wherein the thrust link is a first thrust link, further including a second thrust link, the second thrust link including a forward end and an aft end, the forward end of the second thrust link coupled to the aircraft engine, wherein the chamber is coupled to the aft end of the second thrust link.

The apparatus of any preceding clause, wherein the chamber is coupled to the aircraft engine, a pylon, or an aircraft.

The apparatus of any preceding clause, wherein the damper further includes a spring surrounding the piston rod.

The apparatus of any preceding clause, wherein the spring includes a spring constant of up to 20,000 pounds-per-inch.

The apparatus of any preceding clause, wherein the damper is a first damper, further including a second damper coupled to the aft end of the thrust link, wherein the first damper is coupled to the aircraft engine, and wherein the second damper is coupled to a pylon.

The apparatus of any preceding clause, wherein the first damper is oriented substantially perpendicular to the second damper.

The apparatus of any preceding clause, wherein the thrust link is a first thrust link and the damper is a first damper, further including a second thrust link including a forward end and an aft end, the forward end coupled to the aircraft engine, and a second damper coupled to the aft end of the second thrust link, wherein the first damper and the second damper couple the first thrust link and the second thrust link to an engine carcass.

The apparatus of any preceding clause, further including a third damper to couple the aft end of the first thrust link to a fan casing, a nacelle, or a pylon, and a fourth damper to couple the aft end of the second thrust link to the fan casing, the nacelle, or the pylon.

An apparatus to support an aircraft engine, the apparatus comprising a thrust link including a forward end and an aft end, the forward end of the thrust link coupled to the aircraft engine, a first damper coupled to the aft end of the thrust link, the first damper including a first piston rod coupled to the aft end of the thrust link, the first piston rod including a first piston, and a first chamber including a fluid, the first piston movable within the first chamber, the first damper coupled to the aircraft engine, an aircraft, or a pylon, and a second damper coupled to the aft end of the thrust link, the second damper including a second piston rod coupled to the aft end of the thrust link, the second piston rod including a second piston, and a second chamber including the fluid, the second piston to operate within the second chamber, the second damper coupled to the aircraft engine, the first damper oriented substantially perpendicular to the second damper.

The apparatus of any preceding clause, wherein the first damper and the second damper provide a damping ratio that ranges from 0.5 to 2.0.

The apparatus of any preceding clause, wherein the first damper includes a first spring positioned around the first piston rod, and wherein the second damper includes a second spring positioned around the second piston rod.

The apparatus of any preceding clause, wherein the first spring and the second spring have a spring constant up to 20,000 pounds-per-inch.

The apparatus of any preceding clause, wherein the thrust link is a first thrust link, further including a second thrust link including a forward end and an aft end, the forward end of the second thrust link coupled to the aircraft engine, a third damper coupled to (i) the aft end of the second thrust link and (ii) the aircraft engine, the aircraft, or the pylon, and a fourth damper coupled to (i) the aft end of the thrust link and (ii) the aircraft engine, wherein the fourth damper is oriented substantially perpendicular to the third damper.

The apparatus of any preceding clause, wherein the third damper is oriented substantially perpendicular to the first damper, and wherein the fourth damper is oriented substantially perpendicular to the second damper.

An apparatus to support an aircraft engine, the apparatus comprising a first thrust link including a forward end and an aft end, the forward end of the first thrust link coupled to the aircraft engine, a second thrust link including a forward end and an aft end, the forward end of the second thrust link coupled to the aircraft engine, and a damper to couple to the aft end of the first thrust link and to the aft end of the second thrust link.

The apparatus of any preceding clause, wherein the damper includes a piston rod and a chamber, the piston rod coupled to the aft end of the first thrust link, the chamber coupled to the aft end of the second thrust link.

The apparatus of any preceding clause, wherein the damper includes a spring positioned around the piston rod.

The apparatus of any preceding clause, wherein the spring includes a spring constant of up to 20,000 pounds-per-inch.

The apparatus of any preceding clause, wherein the damper provides a damping ratio of or between 0.5 to 2.0.

A thrust link for an aircraft engine, the thrust link comprising a first wall having a forward portion and an aft portion at opposite ends of the thrust link, the forward portion coupled to the aircraft engine, the aft portion coupled to at least one of the aircraft engine or an aircraft structure distinct from the aircraft engine, the aircraft structure including a pylon, and a second wall within an interior area surrounded by the first wall, the second wall spaced apart from the first wall, a space between the first wall and the second wall defining a channel within the interior area, the channel including a fluid, the fluid pressurized based on a damping ratio to dissipate the resonant vibration frequency generated by the aircraft engine.

The thrust link of any preceding clause, wherein the damping ratio is based on a target response to the resonant vibration frequency, an initial amplitude of the resonant vibration frequency associated with the aircraft engine, an exponential function, a decay rate, the resonant vibration frequency, and a phase angle of a response to the initial amplitude.

The thrust link of any preceding clause, wherein the damping ratio has a range of 0.5 to 2.0.

The thrust link of any preceding clause, wherein a pressure of the fluid is between 50 pounds-per-square-inch and 500 pounds-per-square-inch.

The thrust link of any preceding clause, wherein the fluid includes at least one of oil, non-corrosive fluid, nitrogen, or an inert gas.

The thrust link of any preceding clause, wherein the channel containing the fluid extends across a span of the thrust link.

The thrust link of any preceding clause, further including a first diameter of the first wall from the forward portion of the first wall to 10% of a span of the thrust link and from 90% of the span to the aft portion of the first wall, and a second diameter of the first wall starting between 10% and 40% of the span and ending between 60% and 90% of the span, the second diameter to define a second diameter span.

The thrust link of any preceding clause, wherein the first diameter has a range of 2 inches to 7 inches, the second diameter has a range of 3.5 inches to 6 inches, and the second diameter span has a range of 10 inches to 30 inches.

The thrust link of any preceding clause, wherein the first diameter is tapered into the second diameter from 10% of the span to 40% of the span and the second diameter is tapered back to the first diameter from 60% of the span to 90% of the span.

The thrust link of any preceding clause, wherein the second wall extends from the forward portion of the first wall to between 10% and 40% of the span of the thrust link and between 60% and 90% of the span of the thrust link to the aft portion of the first wall, the channel defined by a space between the first wall and the second wall from the forward portion of the first wall to between 10% and 40% of the span of the thrust link and between 60% and 90% of the span of the thrust link to the aft portion of the first wall.

The thrust link of any preceding clause, wherein the first wall includes a uniform diameter from the forward portion to the aft portion.

The thrust link of any preceding clause, further including a first thickness from the forward portion of the first wall to between 10% and 40% of the span and from between 60% and 90% of the span to the aft portion of the first wall, and a second thickness between 10% and 40% of the span and between 60% and 90% of the span.

The thrust link of any preceding clause, further including the first thickness between 40% and 60% of the span.

The thrust link of any preceding clause, wherein a portion of the interior area is solid, the portion of the interior area to separate a forward portion of the second wall from an aft portion of the second wall.

A thrust link for an aircraft engine, the thrust link comprising a channel including a fluid, an outer wall positioned around the channel, the outer wall including a forward portion and an aft portion at opposite ends of the thrust link, the forward portion coupled to the aircraft engine, the aft portion coupled to at least one of the aircraft engine or an aircraft structure distinct from the aircraft engine, the aircraft structure including a pylon, and an inner wall positioned on an opposite side of the channel from the outer wall.

The thrust link of any preceding clause, wherein the fluid is pressurized to a range between 50 pounds-pre-square-inch gauge to 500 pounds-per-square-inch gauge.

The thrust link of any preceding clause, wherein the outer wall defines a non-uniform diameter between the forward portion and the aft portion.

The thrust link of any preceding clause, wherein the outer wall is positioned around an inner area, wherein a first portion of the inner area is hollow, and wherein a second portion of the inner area is solid.

The thrust link of any preceding clause, wherein the inner wall is positioned around an inner area opposite the channel, wherein the inner area is solid.

The thrust link of any preceding clause, wherein the inner wall is positioned around an inner area opposite the channel, wherein the inner area is hollow.

An apparatus to dissipate a resonant vibration frequency produced by a vibration-producing device, the apparatus comprising a thrust link, the thrust link including a proximal end and a distal end, the proximal end of the thrust link coupled to a proximal end of the vibration-producing device, and a damper, the damper coupled to the thrust link, the damper including a piston rod coupled to the distal end of the thrust link, the piston rod including a piston, and a chamber, the piston rod to move within the chamber, the chamber including a fluid, wherein the thrust link is configured to counteract axial forces and moments on the vibration-producing device and the damper is to dissipate the resonant vibration frequency produced from the vibration-producing device using the fluid in the chamber.

The apparatus of any preceding clause, wherein the fluid includes at least one of oil or silicone fluid.

The apparatus of any preceding clause, wherein the chamber is to dissipate the resonant vibration frequency through implementation of a damping ratio applied to the chamber, the damping ratio to define a target response to the resonant vibration frequency produced from the vibration-producing device.

The apparatus of any preceding clause, wherein the damping ratio is calculated based on the target response to the resonant vibration frequency, an initial amplitude of the vibration-producing device, an exponential function, a decay rate, the resonant vibration frequency, and a phase angle of a response to the initial amplitude.

The apparatus of any preceding clause, wherein the damping ratio has a range of 0.5 to 2.0.

The apparatus of any preceding clause, wherein the chamber is coupled to a casing of the vibration-producing device, the casing to surround the vibration-producing device.

The apparatus of any preceding clause, wherein the thrust link is a first thrust link, the apparatus further including a second thrust link, the second thrust link including a proximal end and a distal end, wherein the chamber is coupled to the distal end of the second thrust link, the damper coupling the first thrust link to the second thrust link.

The apparatus of any preceding clause, wherein the chamber is coupled to a distal end of the vibration-producing device.

The apparatus of any preceding clause, wherein the damper further includes a spring surrounding the piston rod, the spring to define an additional damping response to the resonant vibration frequency.

The apparatus of any preceding clause, wherein the damper is to dissipate the resonant vibration frequency through implementation of a damping ratio applied to the chamber and a spring constant applied to the spring, the damping ratio and the spring constant to define a target response to the resonant vibration frequency produced from the vibration-producing device.

The apparatus of any preceding clause, wherein the spring constant is calculated based on a material of the spring and geometric qualities of the spring including at least one of a diameter of the spring and a number of turns in a coil of the spring.

The apparatus of any preceding clause, wherein the spring constant has a range of 0 pounds-per-inch to 20,000 pounds-per-inch.

An apparatus to dissipate a resonant vibration frequency produced by a vibration-producing device, the apparatus comprising a thrust link, the thrust link including a proximal end and a distal end, the proximal end of the thrust link coupled to a proximal end of the vibration-producing device, a first damper coupled to the distal end of the thrust link, the first damper including a first piston rod coupled to the distal end of the thrust link, the first piston rod including a first piston, and a first chamber including a fluid, the first piston to operate within the first chamber, the first damper coupled to a casing of the vibration-producing device, the casing to surround the vibration-producing device, and a second damper coupled to the distal end of the thrust link, the second damper including a second piston rod coupled to the distal end of the thrust link, the second piston rod including a second piston, and a second chamber including the fluid, the second piston to operate within the second chamber, the second damper coupled to a distal end of the vibration-producing device, the first damper oriented perpendicular to the second damper, wherein the thrust link is configured to counteract axial forces and moments on the vibration-producing device and the first and second dampers are to dissipate the resonant vibration frequency produced from the vibration-producing device using the fluid in the first and second chambers to dissipate the resonant vibration frequency.

The apparatus of any preceding clause, wherein the fluid includes at least one of oil or silicone fluid.

The apparatus of any preceding clause, wherein the first and second chambers are to dissipate the resonant vibration frequency through implementation of a damping ratio applied to the first and second chambers, the damping ratio to define a target response to the resonant vibration frequency produced from the vibration-producing device.

The apparatus of any preceding clause, wherein the damping ratio is calculated based on the target response to the resonant vibration frequency, an initial amplitude of the vibration-producing device, an exponential function, a decay rate, the resonant vibration frequency, and a phase angle of a response to the initial amplitude.

The apparatus of any preceding clause, wherein the damping ratio has a range of 0.5 to 2.0.

The apparatus of any preceding clause, wherein the first damper further includes a first spring surrounding the first piston rod and the second damper further includes a second spring surrounding the second piston rod, the first and second springs to define an additional damping response to the resonant vibration frequency.

The apparatus of any preceding clause, wherein the first and second dampers are to dissipate the resonant vibration frequency through implementation of a damping ratio applied to the first and second chambers and a spring constant applied to the first and second springs, the damping ratio and the spring constant to define a target response to the resonant vibration frequency produced from the vibration-producing device.

The apparatus of any preceding clause, wherein the spring constant is calculated based on a material of the first and the second springs and geometric qualities of the first and second springs including at least one of a diameter of the first and second springs and a number of turns in a coil of the first and second springs.

The apparatus of any preceding clause, wherein the spring constant has a range of 0 pounds-per-inch to 20,000 pounds-per-inch.

A thrust link to dissipate a resonant vibration frequency produced by a vibration-generating device, the thrust link comprising a first proximal end coupled to a second proximal end of the vibration-generating device, a first distal end coupled to at least one of a second distal end of the vibration-generating device or a casing surrounding the vibration-generating device, a span, a first diameter at the first proximal end of the thrust link and the first distal end of the thrust link, and a second diameter starting between the first proximal end and the first distal end of the thrust link, the second diameter to define a second diameter span, wherein a placement of the first diameter and the second diameter along the span is determined based on a resonant vibration frequency range.

The thrust link of any preceding clause, further including a stiffness factor calculated based on a wall thickness of the thrust link across the span and a material of the thrust link, a highest value of the stiffness factor occurring between 10% to 40% of the span and between 60% to 90% of the span.

The thrust link of any preceding clause, further including a mass to length ratio across the span of the thrust link, a lowest value of the mass to length ratio occurring between 40% and 60% of the span.

The thrust link of any preceding clause, further including a third diameter between 40% and 60% of the span.

The thrust link of any preceding clause, wherein the third diameter is equal to the first diameter.

The thrust link of any preceding clause, wherein the first diameter is tapered into the second diameter from 10% of the span to 40% of the span and the second diameter is tapered back to the first diameter from 60% of the span to 90% of the span.

The thrust link of any preceding clause, wherein the first diameter and the second diameter are equal, the thrust link further including a first thickness from the first proximal end of the thrust link to between 10% and 40% of the span and from between 60% and 90% of the span to the first distal end of the thrust link, and a second thickness between 10% and 40% of the span and between 60% and 90% of the span.

The thrust link of any preceding clause, further including a third thickness between 40% and 60% of the span, the third thickness equal to the first thickness.

The thrust link of any preceding clause, wherein the first diameter, the second diameter, and the second diameter span are calculated using a function using an operating range of the vibration-generating device.

The thrust link of any preceding clause, wherein an operating range of the vibration-generating device includes two or more modes, each mode represented by a function, wherein the first diameter, the second diameter, and the second diameter span are calculated using two or more functions representing the two or more modes of the operating range of the vibration-generating device.

The thrust link of any preceding clause, wherein the first diameter has a range of 2 inches to 7 inches, the second diameter has a range of 3.5 inches to 6 inches, and the second diameter span has a range of 10 inches to 30 inches.

A thrust link to dissipate a resonant vibration frequency produced by a vibration-generating device, the thrust link comprising a first proximal end coupled to a second proximal end of the vibration-generating device, a first distal end coupled to at least one of a second distal end of the vibration-generating device or a casing surrounding the vibration-generating device, a span, and a damping insert placed on the thrust link, the damping insert to span a distance less than the span, wherein the damping insert span is determined based on a resonant vibration frequency range.

The thrust link of any preceding clause, wherein the damping insert is placed inside of the thrust link, the thrust link to surround the damping insert up to the damping insert span.

The thrust link of any preceding clause, wherein the damping insert is outside of the thrust link, the damping insert to surround the thrust link up to the damping insert span.

The thrust link of any preceding clause, wherein a ratio of the damping insert span to the span is between 0.25 and 0.5.

The thrust link of any preceding clause, wherein the damping insert span is determined based on a damping ratio, the damping ratio to define a target response to the resonant vibration frequency produced from the vibration-generating device.

The thrust link of any preceding clause, wherein the damping ratio is calculated based on a target response to the resonant vibration frequency, an initial amplitude of the vibration-generating device, an exponential function, a decay rate, the resonant vibration frequency, and a phase angle of a response to the initial amplitude.

The thrust link of any preceding clause, wherein the damping ratio has a range of 0.5 to 2.0.

The thrust link of any preceding clause, wherein the damping insert is made of at least one of a foam, rubber, or metal.

A thrust link to dissipate a resonant vibration frequency produced by a vibration-generating device, the thrust link comprising a first proximal end coupled to a second proximal end of the vibration-generating device, a first distal end coupled to at least one of a second distal end of the vibration-generating device or a casing surrounding the vibration-generating device, a diameter, a span, and a bumper coupled to the thrust link at a bumper distance and to the casing, the bumper distance less than the span, wherein the bumper distance is determined based on a resonant vibration frequency range.

The thrust link of any preceding clause, wherein the diameter has a range of 2 inches to 7 inches.

The thrust link of any preceding clause, wherein the bumper distance has a range of 10% to 30% of the span.

The thrust link of any preceding clause, wherein the bumper distance is determined based on a damping ratio, the damping ratio to define a target response to the resonant vibration frequency produced from the vibration-generating device.

The thrust link of any preceding clause, wherein the damping ratio is calculated based on the target response to the resonant vibration frequency, an initial amplitude of the vibration-generating device, an exponential function, a decay rate, the resonant vibration frequency, and a phase angle of a response to the initial amplitude.

The thrust link of any preceding clause, wherein the damping ratio has a range of 0.5 to 2.0.

The thrust link of any preceding clause, wherein the bumper distance is calculated using a function representing an operating range of the vibration-generating device.

The thrust link of any preceding clause, wherein an operating range of the vibration-generating device includes two or more modes, each mode represented by a function, wherein the bumper distance is calculated using two or more functions representing the two or more modes of the operating range of the vibration-generating device.

The thrust link of any preceding clause, further including a stiffness factor calculated based on a wall thickness of the thrust link across the span and a material of the thrust link, a highest value of the stiffness factor occurring between 10% to 40% of the span and between 60% to 90% of the span.

The thrust link of any preceding clause, wherein the bumper is coupled to the thrust link between 60% and 90% of the span.

The thrust link of any preceding clause, further including a mass to length ratio across the span of the thrust link, a lowest value of the mass to length ratio occurring between 40% and 60% of the span.

A thrust link to dissipate a resonant vibration frequency produced by a vibration-generating device, the thrust link comprising a first proximal end coupled to a second proximal end of the vibration-generating device, a first distal end coupled to at least one of a second distal end of the vibration-generating device or a casing surrounding the vibration-generating device, a diameter, a span, a bumper coupled to the thrust link at a bumper distance and to the casing, the bumper distance less than the span, and a damping insert placed inside the thrust link, the damping insert to span a distance less than the span, the thrust link to surround the damping insert, wherein the bumper distance and the damping insert span are determined based on a resonant vibration frequency range.

The thrust link of any preceding clause, wherein a ratio of the damping insert span to the span is between a value of 0.25 and 0.5.

The thrust link of any preceding clause, wherein the diameter has a range of 2 inches to 7 inches.

The thrust link of any preceding clause, wherein the bumper distance has a range of 10% to 30% of the span.

The thrust link of any preceding clause, wherein the damping insert is made of at least one of a foam, rubber, or metal.

The thrust link of any preceding clause, wherein the bumper distance and the damping insert span are determined based on a damping ratio, the damping ratio to define a target response to the resonant vibration frequency produced from the vibration-generating device.

The thrust link of any preceding clause, wherein the damping ratio is calculated based on the target response to the resonant vibration frequency, an initial amplitude of the vibration-generating device, an exponential function, a decay rate, the resonant vibration frequency, and a phase angle of a response to the initial amplitude.

A thrust link to dissipate a resonant vibration frequency generated by a vibration-generating device, the thrust link comprising a first wall having a proximal portion and a distal portion at opposite ends of the thrust link, the proximal portion coupled to a first location on the vibration-generating device and the distal portion coupled to at least one of a second location on the vibration-generating device or a casing surrounding the vibration-generating device, the second location of the vibration-generating device different than the first location of the vibration-generating device, and a second wall within an interior area surrounded by the first wall, the second wall spaced apart from the first wall, a space between the first wall and the second wall defining a channel within the interior area, the channel including a fluid, the fluid pressurized based on a damping ratio to dissipate the resonant vibration frequency generated by the vibration-generating device.

The thrust link of any preceding clause, wherein the damping ratio is calculated based on a target response to the resonant vibration frequency, an initial amplitude of the vibration-generating device, an exponential function, a decay rate, the resonant vibration frequency, and a phase angle of a response to the initial amplitude.

The thrust link of any preceding clause, wherein the damping ratio has a range of 0.5 to 2.0.

The thrust link of any preceding clause, wherein a pressure of the fluid is between 50 pounds-per-square-inch and 500 pounds-per-square-inch.

The thrust link of any preceding clause, wherein the fluid includes at least one of oil, non-corrosive fluid, nitrogen, or an inert gas.

The thrust link of any preceding clause, wherein the channel containing the fluid extends across a span of the thrust link.

The thrust link of any preceding clause, further including a first diameter of the first wall from the proximal portion of the first wall to 10% of a span of the thrust link and from 90% of the span to the distal portion of the first wall, and a second diameter of the first wall starting between 10% and 40% of the span and ending between 60% and 90% of the span, the second diameter to define a second diameter span.

The thrust link of any preceding clause, wherein the first diameter has a range of 2 inches to 7 inches, the second diameter has a range of 3.5 inches to 6 inches, and the second diameter span has a range of 10 inches to 30 inches.

The thrust link of any preceding clause, wherein the first diameter is tapered into the second diameter from 10% of the span to 40% of the span and the second diameter is tapered back to the first diameter from 60% of the span to 90% of the span.

The thrust link of any preceding clause, wherein the second wall extends from the proximal portion of the first wall to between 10% and 40% of the span of the thrust link and between 60% and 90% of the span of the thrust link to the distal portion of the first wall, the channel defined by a space between the first wall and the second wall from the proximal portion of the first wall to between 10% and 40% of the span of the thrust link and between 60% and 90% of the span of the thrust link to the distal portion of the first wall.

The thrust link of any preceding clause, further including a third diameter between 40% and 60% of the span.

The thrust link of any preceding clause, wherein the third diameter is equal to the first diameter.

The thrust link of any preceding clause, wherein the first diameter and the second diameter are equal, the thrust link further including a first thickness from the proximal portion of the first wall to between 10% and 40% of the span and from between 60% and 90% of the span to the distal portion of the first wall, and a second thickness between 10% and 40% of the span and between 60% and 90% of the span.

The thrust link of any preceding clause, further including a third thickness between 40% and 60% of the span, the third thickness equal to the first thickness.

The thrust link of any preceding clause, wherein the fluid is filled within the channel and pressurized based on an operating range of the vibration-generating device, the operating range to define a resonant vibration frequency range for which the thrust link is to dissipate.

The thrust link of any preceding clause, wherein the interior area is solid, the interior area extending to the second wall.

An engine apparatus comprising a first means for generating a first resonant vibration frequency, a second means for generating a second resonant vibration frequency, the first means for generating separate from the second means for generating, and a means for countering the first means for generating and the second means for generating, the means for countering determined using a damping ratio to counter the first resonant vibration frequency and the second resonant vibration frequency, wherein the means for countering is to counteract axial forces and moments generated by the first means for generating and the second means for generating and the means for countering is to dissipate the first resonant vibration frequency produced by the first means for generating and the second resonant vibration frequency produced by the second means for generating.

The engine apparatus of any preceding clause, further including a third means for generating a third resonant vibration frequency, the third means for generating separate from the first means for generating and the second means for generating, the means for countering to dissipate the third resonant vibration frequency generated by the third means for generating.

The engine apparatus of any preceding clause, wherein the damping ratio is calculated based on a target response to the first resonant vibration frequency and the second resonant vibration frequency, an initial amplitude of the engine, an exponential function, a decay rate, the first resonant vibration frequency, the second resonant vibration frequency, and a phase angle of a response to the initial amplitude.

The engine apparatus of any preceding clause, wherein the damping ratio has a range of 0.5 to 2.0.

The engine apparatus of any preceding clause, wherein the means for countering is a damper, the damper including a piston rod coupled to a distal end of a thrust link, the piston rod including a piston, and a chamber, the piston rod to move within the chamber, the chamber including a fluid, wherein the damper is to dissipate the first resonant vibration frequency produced by the first means for generating and the second resonant vibration frequency produced by the second means for generating using the fluid in the chamber.

The engine apparatus of any preceding clause, wherein the fluid includes at least one of oil or silicone fluid.

The engine apparatus of any preceding clause, wherein the damper further includes a spring surrounding the piston rod, the damper to dissipate the first resonant vibration frequency and the second resonant vibration frequency through implementation of the damping ratio applied to the chamber and a spring constant applied to the spring.

The engine apparatus of any preceding clause, wherein the spring constant has a range of 0 pounds-per-inch to 20,000 pounds-per-inch.

The engine apparatus of any preceding clause, wherein the means for countering is a thrust link, the thrust link including a span, a first diameter at a proximal end of the thrust link and a distal end of the thrust link, and a second diameter starting between the proximal end and the distal end of the thrust link, the second diameter to define a second diameter span, wherein a placement of the first diameter and the second diameter along the span is determined based on a range of the first resonant vibration frequency and the second resonant vibration frequency.

The engine apparatus of any preceding clause, further including a third diameter between 40% and 60% of the span.

The engine apparatus of any preceding clause, wherein the first diameter, the second diameter, and the second diameter span are calculated using a function using an operating range of the engine.

The engine apparatus of any preceding clause, wherein an operating range of the engine includes two or more modes, each mode represented by a function, wherein the first diameter, the second diameter, and the second diameter span are calculated using two or more functions representing the two or more modes of the operating range of the engine.

The engine apparatus of any preceding clause, wherein the first diameter has a range of 2 inches to 7 inches, the second diameter has a range of 3.5 inches to 6 inches, and the second diameter span has a range of 10 inches to 30 inches.

The engine apparatus of any preceding clause, wherein the means for countering is a thrust link, the thrust link including a first wall having a proximal portion and a distal portion at opposite ends of the thrust link, and a second wall within an interior area surrounded by the first wall, the second wall spaced apart from the first wall, a space between the first wall and the second wall defining a channel within the interior area, the channel including a fluid, the fluid pressurized based on a damping ratio to dissipate the first resonant vibration frequency produced by the first means for generating and the second resonant vibration frequency produced by the second means for generating.

The engine apparatus of any preceding clause, wherein the fluid includes at least one of oil, non-corrosive fluid, nitrogen, or an inert gas, a pressure of the fluid being between 50 pounds-per-square-inch and 500 pounds-per-square-inch.

An engine apparatus comprising a fan, a low pressure turbine disposed downstream of the fan, and a thrust link coupled to the fan and the low pressure turbine, the thrust link including a vibration damping device, the thrust link to counter a vibration generated by the engine by at least one of the fan or the low pressure turbine using the vibration damping device, wherein the thrust link is to counteract axial forces and moments generated by the engine and the vibration damping device is to dissipate a resonant vibration frequency generated by the engine.

The engine apparatus of any preceding clause, further including a high pressure turbine disposed downstream of the fan and upstream of the low pressure turbine, the high pressure turbine to generate a vibration, the vibration damping device to counter the vibration generated by the high pressure turbine.

The engine apparatus of any preceding clause, wherein the vibration damping device is a damper, the damper including a piston rod coupled to a distal end of the thrust link, the piston rod including a piston, and a chamber, the piston rod to move within the chamber, the chamber including a fluid, wherein the damper is to dissipate the resonant vibration frequency produced from the engine using the fluid in the chamber.

The engine apparatus of any preceding clause, wherein the damper further includes a spring surrounding the piston rod, the damper to dissipate the resonant vibration frequency through implementation of a damping ratio applied to the chamber and a spring constant applied to the spring.

The engine apparatus of any preceding clause, wherein the vibration damping device is the thrust link, the thrust link including a span, a first diameter at a proximal end of the thrust link and a distal end of the thrust link, and a second diameter starting between the proximal end and the distal end of the thrust link, the second diameter to define a second diameter span, wherein a placement of the first diameter and the second diameter along the span is determined based on a resonant vibration frequency range.

The engine apparatus of any preceding clause, wherein the first diameter, the second diameter, and the second diameter span are calculated using a function using an operating range of the engine.

The engine apparatus of any preceding clause, wherein the vibration damping device is the thrust link, the thrust link including a first wall having a proximal portion and a distal portion at opposite ends of the thrust link, and a second wall within an interior area surrounded by the first wall, the second wall spaced apart from the first wall, a space between the first wall and the second wall defining a channel within the interior area, the channel including a fluid, the fluid including at least one of oil, non-corrosive fluid, nitrogen, or an inert gas, the fluid pressurized based on a damping ratio to dissipate the resonant vibration frequency generated by the engine.

A thrust link for an aircraft engine, the thrust link comprising a forward end coupled to the aircraft engine, the forward end including a first diameter, an aft end coupled to at least one of the aircraft engine or a pylon, a thrust link span extending from the forward end to the aft end, the aft end including the first diameter, a first region between the forward end and the aft end, at least a portion of the first region defining a first transition between the first diameter and a second diameter greater than the first diameter, the first region defining a first region span that spans approximately 10% of the thrust link span to approximately 40% of the thrust link span, a second region between the forward end and the aft end, at least a portion of the second region defining a second transition between the first diameter and the second diameter, the second region defining a second region span that spans from approximately 60% of the thrust link span to approximately 90% of the thrust link span.

The thrust link of any preceding clause, wherein the thrust link includes a stiffness factor that is based on a wall thickness of the thrust link across the span and a material of the thrust link, a first region and the second region of the thrust link having a higher value for the stiffness factor than a remainder of the span.

The thrust link of any preceding clause, wherein the thrust link includes a third region spanning from the first region to the second region, wherein the third region includes a greater stiffness than the first region and the second region.

The thrust link of any preceding clause, wherein the thrust link includes a third region spanning from the first region to the second region, wherein the third region includes an approximately constant diameter, wherein the approximately constant diameter is the first diameter, the second diameter, or a third diameter.

The thrust link of any preceding clause, wherein the aft end of the thrust link is coupled to the aircraft engine or the aircraft structure via a damper.

The thrust link of any preceding clause, wherein the first region includes a first taper that extends from the first diameter at 10% of the thrust link span to the second diameter at 40% of the thrust link span, and wherein the second region includes a second taper that extends from the second diameter at 60% of the thrust link span to the first diameter at 90% of the thrust link span.

The thrust link of any preceding clause, wherein the first diameter is a first outer diameter that defines a first thickness extending (i) from the forward end of the thrust link to a portion of the first region and (ii) from a portion of the second region to the aft end of the thrust link, and wherein the second diameter is a second outer diameter that defines a second thickness positioned in the first region and in the second region.

The thrust link of any preceding clause, wherein the thrust link includes a third region spanning from the first region to the second region, the third region including the first outer diameter.

The thrust link of any preceding clause, wherein the first diameter has a range of 2 inches to 7 inches.

The thrust link of any preceding clause, wherein the second diameter has a range of 3.5 inches to 6 inches.

The thrust link of any preceding clause, wherein the second diameter spans a second diameter span that has a range of 10 inches to 30 inches.

A thrust link of an aircraft engine, the thrust link comprising a forward end coupled to the aircraft engine, an aft end coupled to at least one of the aircraft engine or a pylon, a thrust link span defined from the forward end to the aft end, and a damping insert to span a damping insert span that is less than the thrust link span.

The thrust link of any preceding clause, wherein the thrust link includes an outer surface, and wherein the damping insert is placed inside of the outer surface of the thrust link, and wherein the outer surface is to surround the damping insert along at least a portion of the damping insert span.

The thrust link of any preceding clause, wherein the thrust link includes an outer surface, and wherein the damping insert is positioned around the outer surface along at least a portion of the damping insert span.

The thrust link of any preceding clause, wherein a ratio of the damping insert span to the span is between 0.25 and 0.5.

The thrust link of any preceding clause, wherein the damping insert includes foam.

The thrust link of any preceding clause, wherein the damping insert includes plastic.

The thrust link of any preceding clause, wherein the damping insert includes rubber.

The thrust link of any preceding clause, wherein the damping insert includes metal.

A thrust link of an aircraft engine, the thrust link comprising a forward end coupled to the aircraft engine, an aft end coupled to at least one of the aircraft engine or a pylon, wherein a thrust link span of the thrust link extends from the forward end to the aft end, wherein the thrust link includes at least one of a first inner diameter or a first outer diameter defined along a first portion of the thrust link span, and wherein the thrust link includes at least one of a second inner diameter or a second outer diameter defined along a second portion of the thrust link span, and a damping insert to span a damping insert span that is less than the thrust link span.

A thrust link of an aircraft engine, the thrust link comprising a forward end coupled to the aircraft engine, an aft end coupled to the aircraft engine or a pylon, wherein a thrust link span of the thrust link extends from the forward end to the aft end, and a damping insert spanning a damping insert span that is less than the thrust link span, wherein a ratio of the damping insert span to the thrust link span is equal to or between 0.25 and 0.5.

An apparatus to support an aircraft engine, the apparatus comprising a thrust link including a forward end coupled to the aircraft engine, and an aft end coupled to at least one of the aircraft engine or a pylon, and a bumper coupled to (i) the thrust link between the forward end and the aft end and (ii) to an annular fan casing, a nacelle, or the pylon, a bumper distance percentage defined between the aft end and a location on the thrust link at which the bumper couples to the thrust link, the location aft of the forward end.

The apparatus of any preceding clause, wherein the thrust link includes an outer diameter that has a range of 2 inches to 7 inches.

The apparatus of any preceding clause, wherein the thrust link defines a thrust link span that extends from the forward end to the aft end, wherein the bumper distance percentage has a range of 10% to 30% of the span.

The apparatus of any preceding clause, wherein the bumper distance percentage is based on a damping ratio to be produced by the thrust link.

The apparatus of any preceding clause, wherein the damping ratio to be produced by the thrust link is based on a target response to a resonant vibration frequency produced by the aircraft engine, an initial amplitude of the aircraft engine, an exponential function, a decay rate, the resonant vibration frequency, and a phase angle of a response to the initial amplitude.

The apparatus of any preceding clause, wherein the damping ratio has a range of 0.5 to 2.0.

The apparatus of any preceding clause, wherein the thrust link includes an outer diameter (OD), wherein the bumper distance percentage is represented as bumper distance pct, wherein $$EQ1 = OD(\text{in.}) + \frac{\text{Bumper distance pct (\%)}}{10}, \quad \text{EQ1}$$

$$EQ2 = OD(\text{in.}) - \frac{\text{Bumper distance pct (\%)}}{5},$$

and wherein EQ1 is greater than or equal to 5.16 and less than or equal to 7.66, and wherein EQ2 is greater than or equal to −2.44 and less than or equal to 2.66.

The apparatus of any preceding clause, wherein the bumper distance is based on a first operating range of a low-pressure turbine of the aircraft engine and a second operating range of a high-pressure turbine of the aircraft engine.

The apparatus of any preceding clause, wherein the thrust link defines a thrust link span that extends from the forward end to the aft end, 0% of the span defined at the forward end, 100% of the thrust link defined at the aft end, and wherein the location on the thrust link at which the bumper couples to the thrust link is between 60% and 90% of the span.

The apparatus of any preceding clause, wherein the aft end of the thrust link is coupled to the aircraft engine or the pylon via a damper.

An apparatus to support an aircraft engine, the apparatus comprising a thrust link including a forward end coupled to the aircraft engine, an aft end coupled to at least one of the aircraft engine or a pylon, a thrust link span extending from the forward end to the aft end, and a bumper coupled to (i) a portion of the thrust link between the forward end and the aft end and (ii) to an annular fan casing, a nacelle, or the pylon, and a damping insert positioned inside the thrust link, the damping insert to span a damping insert span that is less than the thrust link span, the thrust link to surround the damping insert along the damping insert span.

The apparatus of any preceding clause, wherein a ratio of the damping insert span to the thrust link span is between 0.25 and 0.5.

The apparatus of any preceding clause, wherein the thrust link includes a diameter that has a range of 2 inches to 7 inches.

The apparatus of any preceding clause, wherein a bumper distance percentage is defined between the aft end of the thrust link and the portion of the thrust link to which the bumper couples, the bumper distance percentage has a range of 10% to 30% of the thrust link span.

The apparatus of any preceding clause, wherein the damping insert is made of at least one of a foam, rubber, or metal.

The apparatus of any preceding clause, wherein the aft end of the thrust link is coupled to the aircraft engine or the pylon via a damper.

An apparatus to support an aircraft engine, the apparatus comprising a thrust link including a forward end coupled to the aircraft engine, and an aft end coupled to the aircraft engine or a pylon, a thrust link span extending from the forward end to the aft end, and a bumper coupled to (i) the thrust link between the forward end and the aft end and (ii) to an annular fan casing, a nacelle, or the pylon, a bumper distance percentage defined between the aft end and a location on the thrust link at which the bumper couples to the thrust link, wherein the bumper distance percentage is between 10% and 30% of the thrust link span.

The apparatus of any preceding clause, further including a damping insert positioned inside the thrust link, the damping insert to span a damping insert span that is less than the thrust link span, the thrust link to surround the damping insert along the damping insert span.

The apparatus of any preceding clause, wherein a ratio of the damping insert span to the thrust link span is between 0.25 and 0.5.

The apparatus of any preceding clause, wherein the thrust link includes a diameter that has a range of 2 inches to 7 inches.

The apparatus of any preceding clause, wherein the aft end of the thrust link is coupled to the aircraft engine or the pylon via a damper.

An apparatus to support an aircraft engine, the apparatus comprising a thrust link, the thrust link including a forward end and an aft end, the forward end of the thrust link coupled to the aircraft engine, and a damper including a piston rod coupled to the aft end of the thrust link, the piston rod including a piston, and a chamber, the piston rod to move within the chamber, the chamber including a fluid.

An apparatus to support an aircraft engine, the apparatus comprising a thrust link including a forward end and an aft end, the forward end of the thrust link coupled to the aircraft engine, and a damper including: a piston rod coupled to the aft end of the thrust link, the piston rod including a piston, and a chamber including a fluid, the piston to move within the chamber.

The apparatus of any preceding clause, wherein the damper provides a damping ratio that ranges from 0.5 to 2.0.

The apparatus of any preceding clause, wherein the chamber is coupled to a casing of the aircraft engine, a nacelle, or a pylon.

The apparatus of any preceding clause, wherein the thrust link is a first thrust link, further including a second thrust link, the second thrust link including a forward end and an aft end, the forward end of the second thrust link coupled to the aircraft engine, wherein the chamber is coupled to the aft end of the second thrust link.

The apparatus of any preceding clause, wherein the chamber is coupled to the aircraft engine or a pylon.

The apparatus of any preceding clause, wherein the damper further includes a spring surrounding the piston rod.

The apparatus of any preceding clause, wherein the piston is movable in the chamber in more than two directions.

The apparatus of any preceding clause, wherein the spring includes a spring constant of up to 20,000 pounds-per-inch.

The apparatus of any preceding clause, wherein the damper is a first damper, further including a second damper coupled to the aft end of the thrust link, wherein the first damper is coupled to the aircraft engine, and wherein the second damper is coupled to a pylon.

The apparatus of any preceding clause, wherein the first damper is oriented substantially perpendicular to the second damper.

The apparatus of any preceding clause, wherein the thrust link is a first thrust link and the damper is a first damper, further including a second thrust link including a forward end and an aft end, the forward end coupled to the aircraft engine, and a second damper coupled to the aft end of the second thrust link, wherein the first damper and the second damper couple the first thrust link and the second thrust link to an engine carcass.

The apparatus of any preceding clause, further including a third damper to couple the aft end of the first thrust link to a fan casing, a nacelle, or a pylon, and a fourth damper to couple the aft end of the second thrust link to the fan casing, the nacelle, or the pylon.

An apparatus to support an aircraft engine, the apparatus comprising a thrust link including a forward end and an aft end, the forward end of the thrust link coupled to the aircraft engine, a first damper coupled to the aft end of the thrust link, the first damper including a first piston rod coupled to the aft end of the thrust link, the first piston rod including a first piston, and a first chamber including a fluid, the first piston movable within the first chamber, the first damper coupled to the aircraft engine or a pylon, and a second damper coupled to the aft end of the thrust link, the second damper including a second piston rod coupled to the aft end of the thrust link, the second piston rod including a second piston, and a second chamber including the fluid, the second piston to operate within the second chamber, the second damper coupled to the aircraft engine, the first damper oriented substantially perpendicular to the second damper.

The apparatus of any preceding clause, wherein the first damper and the second damper provide a damping ratio that ranges from 0.5 to 2.0.

The apparatus of any preceding clause, wherein the fluid includes at least one of oil or silicone fluid.

The apparatus of any preceding clause, wherein the first damper includes a first spring positioned around the first piston rod, and wherein the second damper includes a second spring positioned around the second piston rod.

The apparatus of any preceding clause, wherein the first spring and the second spring have a spring constant that has a range of 1 pound-per-inch to 20,000 pounds-per-inch.

The apparatus of any preceding clause, wherein the thrust link is a first thrust link, further including a second thrust link including a forward end and an aft end, the forward end of the second thrust link coupled to the aircraft engine, a third damper coupled to (i) the aft end of the second thrust link and (ii) the aircraft engine or a pylon, and a fourth damper coupled to (i) the aft end of the thrust link and (ii) the aircraft engine, wherein the fourth damper is oriented substantially perpendicular to the third damper.

An apparatus to support an aircraft engine, the apparatus comprising a first thrust link including a forward end and an aft end, the forward end of the first thrust link coupled to the aircraft engine, a second thrust link including a forward end and an aft end, the forward end of the second thrust link coupled to the aircraft engine, and a damper to couple to the aft end of the first thrust link and to the aft end of the second thrust link.

The apparatus of any preceding clause, wherein the damper includes a piston rod and a chamber, the piston rod coupled to the aft end of the first thrust link, the chamber coupled to the aft end of the second thrust link.

The apparatus of any preceding clause, wherein the damper includes a spring positioned around the piston rod.

The apparatus of any preceding clause, wherein the spring includes a spring constant of up to 20,000 pounds-per-inch.

The apparatus of any preceding clause, wherein the damper provides a damping ratio equal to or between 0.5 and 2.0.

A thrust link for an aircraft engine, the thrust link comprising a first wall having a forward portion and an aft portion at opposite ends of the thrust link, the forward portion coupled to the aircraft engine, the aft portion coupled to the aircraft engine, a pylon, or an aircraft associated with the aircraft engine, and a second wall within an interior area surrounded by the first wall, the second wall spaced apart from the first wall, a space between the first wall and the second wall defining a channel within the interior area, the channel including a fluid, the fluid pressurized based on a damping ratio to withstand a resonant vibration frequency generated by the aircraft engine.

The thrust link of any preceding clause, wherein the damping ratio is based on a target response to the resonant vibration frequency, an initial amplitude of the resonant vibration frequency associated with the aircraft engine, an exponential function, a decay rate, the resonant vibration frequency, and a phase angle of a response to the initial amplitude.

The thrust link of any preceding clause, wherein the damping ratio has a range of 0.5 to 2.0.

The thrust link of any preceding clause, wherein a pressure of the fluid is between 50 pounds-per-square-inch and 500 pounds-per-square-inch.

The thrust link of any preceding clause, wherein the fluid includes at least one of oil, non-corrosive fluid, nitrogen, or an inert gas.

The thrust link of any preceding clause, wherein the channel containing the fluid extends across a span of the thrust link.

The thrust link of any preceding clause, further including a first diameter of the first wall from the forward portion of the first wall to 10% of a span of the thrust link and from 90% of the span to the aft portion of the first wall, and a second diameter of the first wall starting between 10% and 40% of the span and ending between 60% and 90% of the span, the second diameter to define a second diameter span.

The thrust link of any preceding clause, wherein the first diameter has a range of 2 inches to 7 inches, the second diameter has a range of 3.5 inches to 6 inches, and the second diameter span has a range of 10 inches to 30 inches.

The thrust link of any preceding clause, wherein the first diameter is tapered into the second diameter from 10% of the span to 40% of the span and the second diameter is tapered back to the first diameter from 60% of the span to 90% of the span.

The thrust link of any preceding clause, wherein the second wall extends from the forward portion of the first wall to between 10% and 40% of the span of the thrust link and between 60% and 90% of the span of the thrust link to the aft portion of the first wall, the space between the first wall and the second wall including a first space between the first wall and the second wall from the forward portion of the first wall to between 10% and 40% of the span of the thrust link and a second space between 60% and 90% of the span of the thrust link to the aft portion of the first wall.

The thrust link of any preceding clause, wherein the first wall includes a uniform diameter from the forward portion to the aft portion.

The thrust link of any preceding clause, further including a first thickness from the forward portion of the first wall to between 10% and 40% of the span and from between 60% and 90% of the span to the aft portion of the first wall, and a second thickness between 10% and 40% of the span and between 60% and 90% of the span.

The thrust link of any preceding clause, further including the first thickness between 40% and 60% of the span.

The thrust link of any preceding clause, wherein a portion of the interior area is solid, the portion of the interior area to separate a forward portion of the second wall from an aft portion of the second wall.

A thrust link for an aircraft engine, the thrust link comprising a channel including a fluid, an outer wall positioned around the channel, the outer wall including a forward portion and an aft portion at opposite ends of the thrust link, the forward portion coupled to the aircraft engine, the aft portion coupled to at least one of the aircraft engine or an aircraft structure distinct from the aircraft engine, the aircraft structure including a pylon, and an inner wall positioned on an opposite side of the channel from the outer wall.

A thrust link for an aircraft engine, the thrust comprising an outer wall positioned around an outer diameter of a channel including a fluid, the outer wall including a forward portion and an aft portion at opposite ends of the thrust link, the forward portion coupled to the aircraft engine, the aft portion coupled to the aircraft engine or an aircraft structure distinct from the aircraft engine, and an inner wall positioned around an inner diameter of the channel.

The thrust link of any preceding clause, wherein the fluid is pressurized to a range between 50 pounds-pre-square-inch gauge to 500 pounds-per-square-inch gauge.

The thrust link of any preceding clause, wherein the outer wall defines a non-uniform diameter between the forward portion and the aft portion.

The thrust link of any preceding clause, wherein the outer wall is positioned around an inner area, wherein a first portion of the inner area is hollow, and wherein a second portion of the inner area is solid.

The thrust link of any preceding clause, wherein the inner wall is positioned around an inner area opposite the channel, wherein the inner area is solid.

The thrust link of any preceding clause, wherein the inner wall is positioned around an inner area opposite the channel, wherein the inner area is hollow.

The apparatus of any preceding clause, wherein the bumper enables limited movement of the thrust link relative to the annular fan casing, the nacelle, or the pylon in more than one direction.

The apparatus of any preceding clause, wherein the annular fan casing, the nacelle, or the pylon includes an orifice through which a portion of the bumper extends, and wherein the portion of the bumper is at least partially separated from the annular fan casing, the nacelle, or the pylon to enable movement of the bumper relative to the annular fan casing, the nacelle, or the pylon.

The apparatus of any preceding clause, wherein the bumper is movable in the orifice in an axial direction and a circumferential direction defined by the aircraft engine.

The apparatus of any preceding clause, wherein the portion of the bumper is a first portion, wherein the bumper includes a second portion and a third portion, the second portion connected to the first portion and positioned on a first side of the orifice, the third portion connected to the first portion and positioned on a second side of the orifice, wherein the second portion and the third portion have a greater diameter than the orifice.

The apparatus of any preceding clause, wherein the first portion of the bumper separates the second portion and the third portion by a length greater than a thickness of the annular fan casing, the nacelle, or the pylon in which the orifice is defined to enable movement of the bumper in a third direction relative to the annular fan casing, the nacelle, or the pylon.

The apparatus of any preceding clause, wherein the third direction is a radial direction defined by the aircraft engine.

The apparatus of any preceding clause, wherein the bumper enables limited movement of the thrust link relative to the annular fan casing, the nacelle, or the pylon in a radial direction defined by the aircraft engine.

The apparatus of any preceding clause, wherein the piston is movable in the chamber in more than two directions.

The apparatus of any preceding clause, wherein the piston is movable in the chamber in four directions.

The apparatus of any preceding clause, wherein the piston includes a piston chamber in which the fluid in the chamber is flowable.

The apparatus of any preceding clause, wherein the piston includes orifices through which the fluid in the chamber is flowable into or out of the piston chamber.

The apparatus of any preceding clause, wherein the orifices include a first orifice and a second orifice, wherein the fluid flows through the first orifice when the piston moves in a first direction, wherein the fluid flows through the second orifice when the piston moves in a second direction different than the first direction.

The apparatus of any preceding clause, wherein the orifices include a third orifice, wherein the fluid flows through the third orifice when the piston moves in a third direction different than the first direction and the second direction.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A thrust link for an aircraft engine, the thrust link comprising:
 a first wall having a forward portion and an aft portion at opposite ends of the thrust link, the forward portion coupled to the aircraft engine, the aft portion coupled to the aircraft engine, a pylon, or an aircraft associated with the aircraft engine; and
 a second wall within an interior area surrounded by the first wall, the second wall spaced apart from the first wall, a space between the first wall and the second wall defining a channel within the interior area, the channel including a fluid, the fluid pressurized based on a damping ratio to withstand a resonant vibration frequency generated by the aircraft engine.

2. The thrust link of claim 1, wherein the damping ratio is based on a target response to the resonant vibration frequency, an initial amplitude of the resonant vibration frequency associated with the aircraft engine, an exponential function, a decay rate, the resonant vibration frequency, and a phase angle of a response to the initial amplitude.

3. The thrust link of claim 1, wherein the damping ratio has a range of 0.5 to 2.0.

4. The thrust link of claim 1, wherein a pressure of the fluid is between 50 pounds-per-square-inch and 500 pounds-per-square-inch.

5. The thrust link of claim 1, wherein the fluid includes at least one of an oil, a non-corrosive fluid, nitrogen, or an inert gas.

6. The thrust link of claim 1, wherein the channel containing the fluid extends across a span of the thrust link.

7. The thrust link of claim 1, wherein:
the first wall has a first diameter from the forward portion of the first wall to 10% of a span of the thrust link and from 90% of the span to the aft portion of the first wall; and
the first wall has a second diameter starting between 10% and 40% of the span and ending between 60% and 90% of the span, the second diameter defining a second diameter span.

8. The thrust link of claim 7, wherein the first diameter has a range of 2 inches to 7 inches, the second diameter has a range of 3.5 inches to 6 inches, and the second diameter span has a range of 10 inches to 30 inches.

9. The thrust link of claim 7, wherein the first diameter is tapered into the second diameter from 10% of the span to 40% of the span and the second diameter is tapered back to the first diameter from 60% of the span to 90% of the span.

10. The thrust link of claim 7, wherein the second wall extends from the forward portion of the first wall to between 10% and 40% of the span of the thrust link and between 60% and 90% of the span of the thrust link to the aft portion of the first wall, the space between the first wall and the second wall including a first space between the first wall and the second wall from the forward portion of the first wall to between 10% and 40% of the span of the thrust link and a second space between 60% and 90% of the span of the thrust link to the aft portion of the first wall.

11. The thrust link of claim 1, wherein the first wall includes a uniform diameter from the forward portion to the aft portion.

12. The thrust link of claim 1, wherein a thrust link span extends from the forward portion to the aft portion, the thrust link further including:
a first thickness from the forward portion of the first wall to between 10% and 40% of the thrust link span and from between 60% and 90% of the thrust link span to the aft portion of the first wall; and
a second thickness between 10% and 40% of the thrust link span and between 60% and 90% of the thrust link span.

13. The thrust link of claim 12, further including the first thickness between 40% and 60% of the thrust link span.

14. The thrust link of claim 1, wherein a portion of the interior area is solid, the portion of the interior area separates a forward portion of the second wall from an aft portion of the second wall.

15. A thrust link for an aircraft engine, the thrust link comprising:
an outer wall positioned around an outer diameter of a channel including a fluid, the outer wall including a forward portion and an aft portion at opposite ends of the thrust link, the forward portion coupled to the aircraft engine, the aft portion coupled to the aircraft engine or an aircraft structure distinct from the aircraft engine; and
an inner wall positioned around an inner diameter of the channel.

16. The thrust link of claim 15, wherein the fluid is pressurized to a range between 50 pounds-pre-square-inch gauge to 500 pounds-per-square-inch gauge.

17. The thrust link of claim 15, wherein the outer wall defines a non-uniform diameter between the forward portion and the aft portion.

18. The thrust link of claim 15, wherein the outer wall is positioned around an inner area, wherein a first portion of the inner area is hollow, and wherein a second portion of the inner area is solid.

19. The thrust link of claim 15, wherein the inner wall is positioned around an inner area opposite the channel, wherein the inner area is solid.

20. The thrust link of claim 15, wherein the inner wall is positioned around an inner area opposite the channel, wherein the inner area is hollow.

* * * * *